(12) United States Patent
Reisslein et al.

(10) Patent No.: US 10,306,670 B2
(45) Date of Patent: May 28, 2019

(54) SYSTEMS AND METHODS FOR A SMART GATEWAY SDN-BASED BACKHAUL ARCHITECTURE FOR SMALL CELLS

(71) Applicant: ARIZONA BOARD OF REGENTS ON BEHALF OF ARIZONA STATE UNIVERSITY, Tempe, AZ (US)

(72) Inventors: Martin Reisslein, Tempe, AZ (US); Akhilesh Thyagaturu, Tempe, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 0 days.

(21) Appl. No.: 15/476,611

(22) Filed: Mar. 31, 2017

(65) Prior Publication Data

US 2017/0290049 A1 Oct. 5, 2017

Related U.S. Application Data

(60) Provisional application No. 62/318,410, filed on Apr. 5, 2016.

(51) Int. Cl.
| | |
|---|---|
| *H04W 72/14* | (2009.01) |
| *H04W 16/32* | (2009.01) |
| *H04W 72/04* | (2009.01) |
| *H04W 88/16* | (2009.01) |
| *H04W 88/12* | (2009.01) |

(52) U.S. Cl.
CPC ........... *H04W 72/14* (2013.01); *H04W 16/32* (2013.01); *H04W 72/0413* (2013.01); *H04W 88/12* (2013.01); *H04W 88/16* (2013.01)

(58) Field of Classification Search
CPC . H04W 72/14; H04W 72/0413; H04W 16/32; H04W 88/12; H04W 88/16
See application file for complete search history.

(56) References Cited

U.S. PATENT DOCUMENTS

| | | | | |
|---|---|---|---|---|
| 2009/0034457 | A1* | 2/2009 | Bahl | H04W 16/10 370/329 |
| 2012/0020307 | A1* | 1/2012 | Henderson | H04W 28/16 370/329 |

(Continued)

FOREIGN PATENT DOCUMENTS

EP 1017244 A1 * 7/2000 ......... H04Q 11/0478

OTHER PUBLICATIONS

Z. Shen, A. Papasakellariou, J. Montojo, D. Gerstenberger, and F. Xu, "Overview of 3GPP LTE-advanced carrier aggregation for 4G wireless communications," IEEE Communications Magazine, vol. 50, No. 2, pp. 122-130, Feb. 2012.

(Continued)

*Primary Examiner* — Kathy W Wang-Hurst
*Assistant Examiner* — Minjung Kim
(74) *Attorney, Agent, or Firm* — Polsinelli PC

(57) ABSTRACT

A new access networking framework is provided for supporting small cell deployments based on the sharing of network resources. A smart gateway framework flexibly accommodates eNB connections and dynamically assigns uplink transmission resources to the eNBs. Novel techniques are also introduced for sharing the small cell infrastructures among multiple operators through virtualization and SDN based reconfiguration.

14 Claims, 11 Drawing Sheets

(56) References Cited

U.S. PATENT DOCUMENTS

2012/0282962 A1* 11/2012 Madon ............... H04W 16/04
455/509
2016/0330743 A1* 11/2016 Das .................. H04W 76/10

OTHER PUBLICATIONS

B. Bjerke, "LTE-advanced and the evolution of LTE deployments," IEEE Wireless Communications, vol. 18, No. 5, pp. 4-5, Oct. 2011.
T. Nakamura, S. Nagata, A. Benjebbour, Y. Kishiyama, T. Hai, S. Xiaodong, Y. Ning, and L. Nan, "Trends in small cell enhancements in LTE advanced," IEEE Communications Magazine, vol. 51, No. 2, pp. 98-105, Feb. 2013.
A. Alsohaily and E. Sousa, "Dynamic spectrum access for small cells," in Proc. IEEE Int. Symposium on Personal Indoor gand Mobile Radio Communications (PIMRC), Sep. 2013, pp. 3308-3312.
W. Ni, R. P. Liu, I. Collings, and X. Wang, "Indoor cooperative small cells over ethernet," IEEE Communications Magazine, vol. 51, No. 9, pp. 100-107, Sep. 2013.
N. Mahmood, G. Berardinelli, F. Tavares, and P. Mogensen, "On the potential of full duplex communication in 5G small cell networks," in Proc. IEEE Vehicular Technology Conference (VTC Spring), May 2015, pp. 1-5.
C. Shen, J. Xu, and M. van der Schaar, "Silence is gold: Strategic small cell interference management using tokens," in Proc. IEEE Global Communications Conference (GLOBECOM), Dec. 2014, pp. 4359-4365.
U. Siddique, H. Tabassum, E. Hossain, and D. I. Kim, "Wireless backhauling of 5G small cells: challenges and solution approaches," IEEE Wireless Communications, vol. 22, No. 5, pp. 22-31, Oct. 2015.
F. Limbach, R. Zamekow, and M. Dueser, "Cooperative private next-generation access deployment—a relational view," in Proc. IEEE Hawaii International Conference on System Sciences (HICSS), Jan. 2013, pp. 1444-1453.
S.-F. Chou, T.-C. Chiu, Y.-J. Yu, and A.-C. Pang, "Mobile small cell deployment for next generation cellular networks," in Proc. IEEE Global Communications Conference (GLOBECOM), Dec. 2014, pp. 4852-4857.
A. Blenk, A. Basta, M. Reisslein, and W. Kellerer, "Survey on network virtualization hypervisors for software defined networking," IEEE Communications Surveys & Tutorials, in print, 2015.
A. Mercian, M. McGarry, M. Reisslein, and W. Kellerer, "Software defined optical access networks (SDOANs): A comprehensive survey," arXiv preprint, arXiv:1511.04376, 2015. 16.
A. Mohamed, O. Onireti, M. Imran, A. Imran, and R. Tafazolli, "Control-data separation architecture for cellular radio access networks: A survey and outlook," IEEE Communications Surveys & Tutorials, in print, 2015.
D. Kreutz, F. M. Ramos, P. Esteves Verissimo, C. Esteve Rothenberg, S. Azodolmolky, and S. Uhlig, "Software-defined networking: A comprehensive survey," Proceedings of the IEEE, vol. 103, No. 1, pp. 14-76, 2015.
L. Zhou, N. Chand, X. Liu, G. Peng, H. Lin, Z. Li, Z. Wang, X. Zhang, S. Wang, and F. Effenberger, "Demonstration of software-defined flexible-PON with adaptive data rates between 13.8 Gb/s and 5.2 Gb/s supporting link loss budgets between 15 dB and 35 dB," in Proc. IEEE European Conference on Optical Communication (ECOC), 2014, pp. 1-3.
M. P. McGarry, M. Reisslein, C. J. Colbourn, M. Maier, F. Aurzada, and M. Scheutzow, "Justin-time scheduling for multichannel EPONs," IEEE/OSA Journal of Lightwave Technology, vol. 26, No. 10, pp. 1204-1216, 2008. 17.
M. P. McGarry, M. Maier, and M. Reisslein, "Ethernet PONs: a survey of dynamic bandwidth allocation (DBA) algorithms," IEEE Communications Magazine, vol. 42, No. 8, pp. S8-S15, 2004.

X. Wei, F. Aurzada, M. P. McGarry, and M. Reisslein, "DyCaPPON: Dynamic circuit and packet passive optical network," Optical Switching and Networking, vol. 13, pp. 135-147, 2014.
F. Aurzada, M. Scheutzow, M. Reisslein, N. Ghazisaidi, and M. Maier, "Capacity and delay analysis of next-generation passive optical networks (NG-PONs)," IEEE Transactions on Communications, vol. 59, No. 5, pp. 1378-1388, 2011.
F. Aurzada, M. L'evesque, M. Maier, and M. Reisslein, "FiWi access networks based on next-generation PON and gigabit-class WLAN technologies: A capacity and delay analysis," IEEE/ACM Transactions on Networking, vol. 22, No. 4, pp. 1176-1189, 2014.
M. Kiaei, K. Fouli, M. Scheutzow, M. Maier, M. Reisslein, and C. Assi, "Low-latency polling schemes for long-reach passive optical networks," IEEE Transactions on Communications, vol. 61, No. 7, pp. 2936-2945, 2013.
F. Effenberger, "PON resilience," in Proc. OSA Optical Fiber Communication Conference, 2014, pp. Tu3C-1.
M. Hossen and M. Hanawa, "A novel dynamic bandwidth allocation algorithm for multi-OLT and multi-wavelength PON-based hybrid networks," in Proc. International Forum on Strategic Technology (IFOST), 2014, pp. 69-72
F. Rawshan and Y. Park, "Protection of WDM PON systems based on modified 2-olt architecture," in International Conference on Electrical Information and Communication Technology (EICT), 2014, pp. 1-3.
M. Hossen and M. Hanawa, "Dynamic bandwidth allocation algorithm with proper guard time management over multi-OLT PON-based hybrid FTTH and wireless sensor networks," IEEE/OSA Journal of Optical Communications and Networking, vol. 5, No. 7, pp. 802-812,2013.
F. Rawshan, M. Ju, and Y. Park, "Application of a multi-OLT PON system and its dynamic bandwidth allocation algorithm," in Proc. International Conference on Ubiquitous and Future Networks (ICUFN), 2012, pp. 276-279.
M. Hossen and M. Hanawa, "Adaptive limited Dba algorithm for multi-OLT PON-based FTTH and wireless sensor netwroks," in Asia-Pacific Conference on Communications (APCC), 2012, pp. 372-377. 18.
D. Lopez-Perez, M. Ding, H. Claussen, and A. Jafari, "Towards 1 Gbps/UE in cellular systems: Understanding ultra-dense small cell deployments," IEEE Communications Surveys & Tutorials, in print, 2015.
E. Liu and K. Leung, "Proportional fair scheduling: Analytical insight under rayleigh fading environment," in Proc. IEEE Wireless Communications and Networking Conference, Mar. 2008, pp. 1883-1888.
S. Lakshminarayana, M. Assaad, and M. Debbah, "H-infinity control based scheduler for the deployment of small cell networks," in Proc. Int. Symposium on Modeling and Optimization in Mobile, Ad Hoc and Wireless Networks (WiOpt), May 2011, pp. 9-16.
R. Jain, D.-M. Chiu, and W. Hawe, "A quantitative measure of fairness and discrimination for resource allocation in shared computer systems," 1998.
F. Aurzada, M. Scheutzow, M. Reisslein, N. Ghazisaidi, and M. Maier, "Capacity and delay analysis of next-generation passive optical networks (NG-PONs)," IEEE Transactions on Communications, vol. 59, No. 5, pp. 1378-1388, May 2011.
Thyagaturu, A. S., Dashti, Y., & Reisslein, M. (2016). SDN-Based Smart Gateways (Sm-GWs) for Multi-Operator Small Cell Network Management. IEEE Transactions on Network and Service Management, 13(4), 740-753.
Q. Zhu and X. Zhang, "Game-theory based power and spectrum virtualization for maximizing spectrum efficiency over mobile cloud-computing wireless networks," in Proc. Annual Conference on Information Sciences and Systems (CISS), Mar. 2015, pp. 1-6.
E. Mugume and D. So, "Spectral and energy efficiency analysis of dense small cell networks," in Proc. IEEE Vehicular Technology Conference (VTC Spring), May 2015, pp. 1-5.

* cited by examiner

SYSTEMS AND METHODS FOR A SMART GATEWAY SDN-BASED BACKHAUL ARCHITECTURE FOR SMALL CELLS

CROSS REFERENCE TO RELATED APPLICATIONS

This is a non-provisional application that claims benefit to U.S. provisional application Ser. No. 62/318,410, filed on Apr. 5, 2016, which is herein incorporated by reference in its entirety.

FIELD

The present disclosure relates to backhaul architectures and in particular to systems and methods for a smart gateway SDN-based backhaul architecture for small cells.

BACKGROUND

Recent wireless communications research has examined the benefits of splitting the conventional cells in wireless cellular communications into small cells for supporting the growing wireless network traffic. Small cells can coexist with neighboring small cells while sharing the same spectrum resources, and are thus an important potential strategy for accommodating wireless network traffic growth. Small cells are also sometimes referred to as "femto" cells in the context of the Third Generation Partnership Project (3GPP) Long Term Evolution (LTE) wireless standard; although the general terminology "small" cells is used throughout the present disclosure. However, small cells pose new challenges, including interference coordination, backhaul complexity, and increased network infrastructure cost.

Small cell networks are expected to be privatively owned. Therefore it is important to enable usage flexibility and the freedom of investment in the new network entities (e.g., gateways and servers) and the network infrastructures (e.g., switches and optical fiber) by the private owners of small cells. While a plethora of studies has examined advanced enhanced Node B (eNB) resource management, the implications of small cell deployments for backhaul gateways have largely remained unexplored. Generally, backhaul access networks that interconnect small cell deployments with LTE gateways can employ a wide variety of link layer (L2) technologies, including SONET/SDH, native Ethernet, and Ethernet over MPLS. In order to accommodate these heterogeneous L2 technologies, cellular LTE network interfaces, such as SI and X2 interfaces, are purposefully made independent of the L2 technology between small cell deployments and gateways. Due to the independent nature of L2 technologies, a dedicated link with prescribed QoS, which can support the fundamental operations of cellular protocols, must be established for each interface connection. Statistical multiplexing is then limited by the aggregate of the prescribed QoS requirements and only long-term reconfigurations, e.g., in response to deployment changes, can optimize the back-haul transmissions. Present wireless network deployments based on the 3GPP LTE standard do not provide feedback from the eNBs to a central decision entity, e.g., an SDN orchestrator, which could flexibly allocate network resources based on eNB traffic demands. Thus, present wireless back-haul architectures are characterized by (i) essentially static network resource allocations between eNBs and operator gateways, e.g., LTE Servicing/Packet Gateways (S/P-GWs), and (ii) lack of coordination between the eNBs and the operator gateways in allocating these network resources, resulting in under-utilization of the back-haul transmission resources. Additionally, exhaustion of available ports at the operator gateways can limit the eNB deployment in practice.

The static resource allocations and lack of eNB-gateway cooperation are highly problematic since the aggregate uplink transmission bitrate of the small cells within a small geographic area, e.g., in a building, is typically much higher than the uplink transmission bitrate available from the cellular operators. Thus, small cell deployments create a bottleneck between the eNBs and the operator gateways. For instance, consider the deployment of 100 small cells in a building, whereby each small cell supports 1 Gbps uplink transmission bitrate. Either each small cell can be allocated only one hundredth of the operator bitrate for this building or the operator would need to install 100 Gbps uplink transmission bitrate for this single building, which would require cost-prohibitive operator gateway installations for an organization with several buildings in a small geographical area. However, the uplink transmissions from the widespread data communication applications consist typically of short high-bitrate bursts, e.g., 100 Mbps bursts. If typically no more than ten small cells burst simultaneously, then the eNBs can dynamically share a 1 Gbps operator uplink transmission bitrate. An additional problem is that with the typically limited port counts on operator gateways, connections to many new small cells may require new operator gateway installations. An intermediate Sm-GW can aggregate the small cell connections and thus keep the required port count at operator gateways low.

It is with these observations in mind, among others, that various aspects of the present disclosure were conceived and developed.

BRIEF DESCRIPTION OF THE DRAWINGS

Corresponding reference characters indicate corresponding elements among the view of the drawings. The headings used in the figures do not limit the scope of the claims.

DETAILED DESCRIPTION

Figure 1:
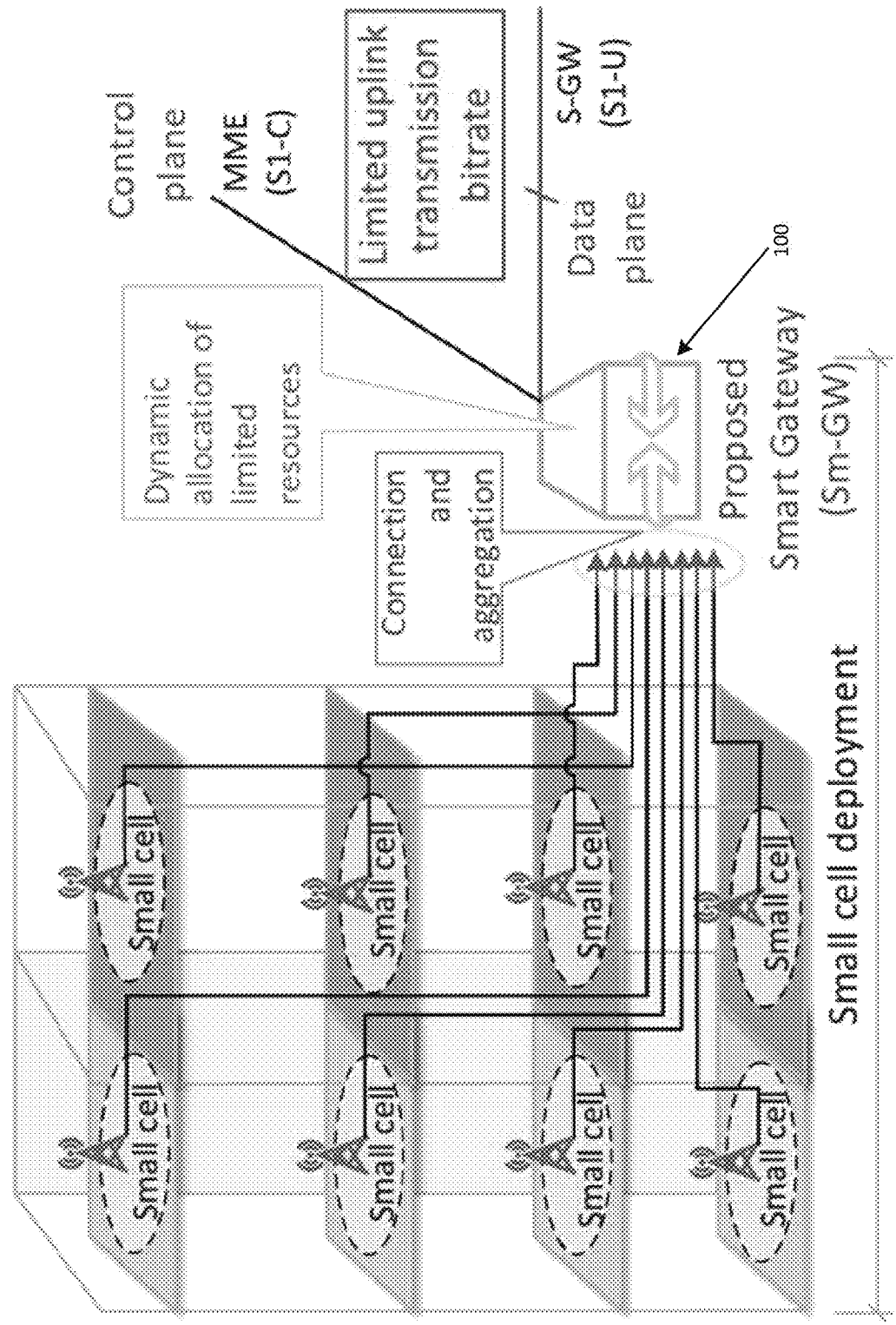
FIG. 1 is a simplified illustration showing an embodiment of a smart gateway (Sm-GW) inserted between small cell base stations and access points, according to one aspect of the present disclosure.

Referring to the drawings, embodiments of a Smart Gateway (Sm-GW) framework are illustrated and generally indicated as 100 in FIGS. 1-10.

Small cell networks are expected to be privatively owned. Therefore it is important to enable usage flexibility and the freedom of investment in the new network entities (e.g., gateways and servers) and the network infrastructures (e.g., switches and optical fiber) by the private owners of small cells. The Sm-GW framework 100 enables the private owners of small cells to utilize the cellular gateways, e.g., LTE Serving Gateway (S-GW) and Packet Gateway (P-GW), based on different service level agreements (SLAs) across multiple operators through SDN and virtualization.

FIG. 1 illustrates a possible small cell deployment scenario in an enterprise building. Small cells are referred to cells in the context of LTE. As the deployment of small cells grows rapidly, static allocations of backhaul network resources would result in under-utilization of resources due to the bursty traffic nature of modern applications. While a plethora of studies has examined advanced eNB resource management, the implications of small cell deployments for backhaul gateways have largely remained unexplored. In the present wireless network architectures, such as LTE, the main reasons for under-utilization are: 1) static (or non-flexible) network resource assignments between an eNB and the gateway (S-GW, P-GW), and 2) lack of traffic coordination between the eNBs and their gateways. For the same reasons, it is physically impossible to accommodate additional eNBs on a particular gateway (S/P-GW), e.g., to increase the coverage area, even when only very low traffic levels originate from the connected eNBs. Specifically, port exhaustion at the gateways commonly limits the deployment of additional eNBs. Additional eNBs would require a new gateway (S/P-GW), resulting in high expenditures. In contrast, the Sm-GW framework 100 of the present disclosure accommodates large numbers of eNBs by flexibly sharing network resources. However, if the eNBs consistently overload the Sm-GW framework 100, then new Sm-GWs frameworks 100 along with new connections to the operator core gateways (S/P-GWs) have to be installed.

Typically, the aggregate service capacity (transmission bitrate) of all small cells within a building is much larger than the single connection service provided by the cellular operators, thus creating a bottleneck. For instance, if 100 femto cells, each supporting 1 Gbps in the uplink are deployed in a building, two issues arise: 1) suppose one S-GW supports 16 connections, then 7 S-GWs are required, and 2) the aggregated traffic requirement from all the 7 S-GWs would result in 100 Gbps, causing a similar requirement at the P-GW. The discussed requirements are for a single building and there could be several buildings belonging to same organization within a small geographical area. It is argued here that: 1) providing the 100 Gbps connectivity to every building would be very expensive, and 2) with sharing the resource requirement can be reduced to, say, 1 Gbps, and 3) the infrastructure increases (new S/P-GWs) can be curtailed, thereby reducing the cost for the cellular operators.

Figure 2:
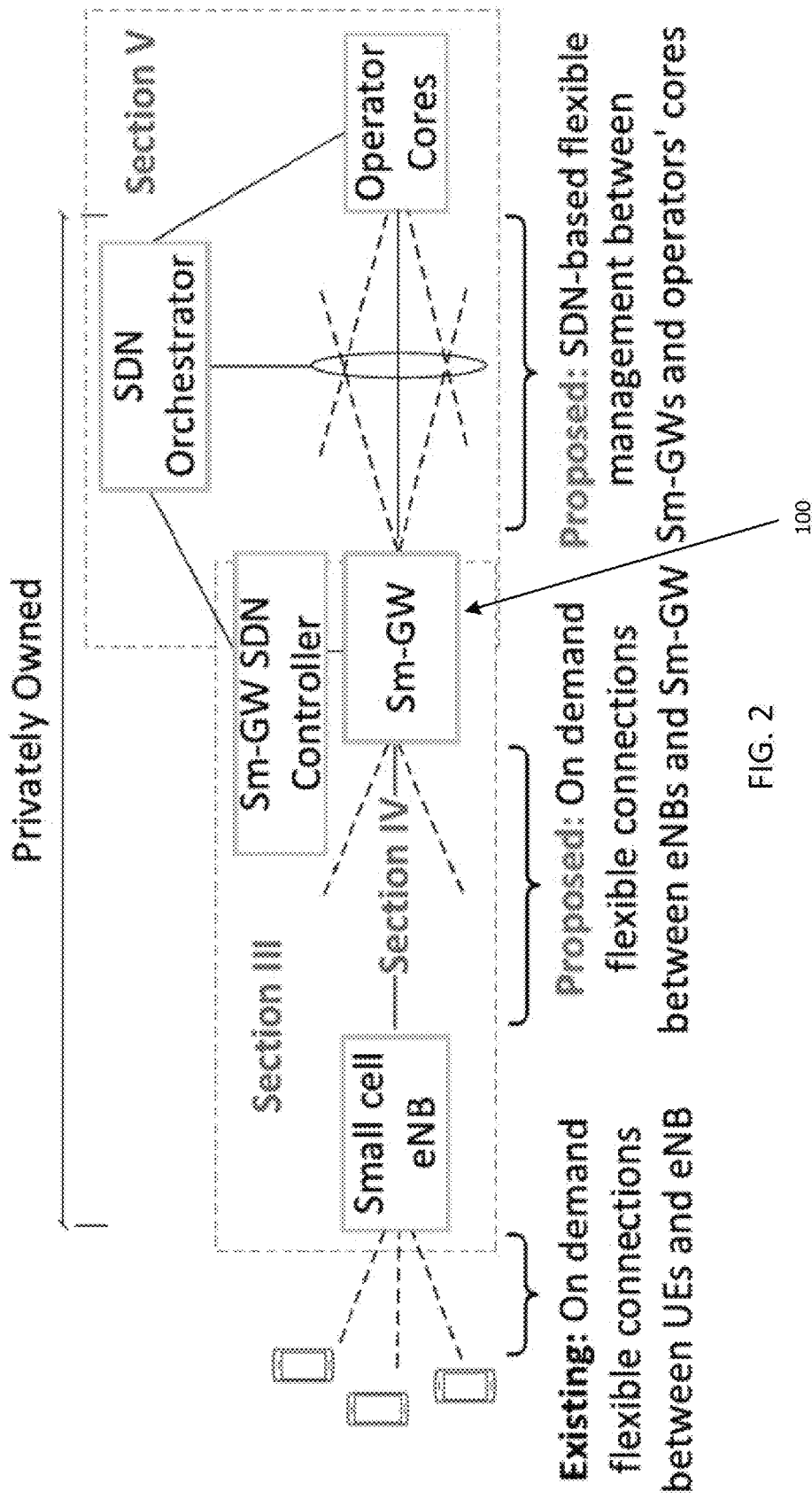
FIG. 2 is a simplified illustration showing a smart gateway architecture consisting of privately owned smart gateways inserted between an existing convention operator core, according to one aspect of the present disclosure.

A new access networking framework is provided for supporting small cell deployments based on the sharing of network resources. A novel network entity, the Sm-GW framework 100, is shown in FIGS. 1 and 2. The Sm-GW framework 100 flexibly accommodates eNB connections and dynamically assigns uplink transmission resources to the eNBs. Novel techniques are also introduced for sharing the small cell infrastructures among multiple operators through virtualization and SDN based reconfiguration, The main techniques presented here are:

- A Sm-GW framework 100 to accommodate a flexible number of eNBs while reducing the requirements at the operator's core (e.g., LTE S-GW and MME), thereby reducing the network cost.
- A Sm-GW scheduling framework 200 to share the limited backhaul network resources among all the connected small cell eNBs.
- An adaptive SDN-based network optimization technique to maximize the utilization of the available resources from multiple operators with dynamically changing user requirements.

A novel method of sharing the cellular net-work infrastructure is disclosed between multiple operators using software defined networking (SDN). In contrast to prior SDN based cellular networking architectures, e.g., cellSDN, software defined cellular networks, software defined mobile networks, and SoftRAN, the primary focus is to enable the flexible communication resource sharing between the small cell eNBs and the backhaul of multiple operators. Also, in contrast to prior architectures, the Sm-GW framework 100 does not require major changes to the existing (hardware) infrastructure, reducing the transition and new deployment cost. The virtualization of the Sm-GWs through SDN enables the slicing the Sm-GW resources, therefore providing operational independence to the software-defined applications of operators. The software defined orchestration enables connectivities as well as bandwidth and QoS allocations based on the service level agreements (SLAs) with the cellular operators.

For the purpose of an illustration, consider a use case where a university has multiple buildings, each building has hundreds of femto cells that are flexibly connected to the Sm-GW framework 100. Multiple Sm-GWs 100 are then connected to the S-GWs and P-GWs of multiple cellular operators (LTE backhaul/core) via physical links (e.g., optical or microwave links). An SDN orchestrator manages the cellular infrastructure. The controller software or NOS assigns permissions to third-party controller applications from the cellular network operators. The controller applications coordinate the backhaul resources to dynamically allocate and reconfigure the bandwidth to each Sm-GW framework 100 based on the requirement of each sliced resource of the Sm-GW framework 100. Thus, the Sm-GW framework 100 enables two levels of flexibility in the resource management: (i) from the Sm-GW frameworks 100 towards the eNBs, and (ii) from the Sm-GWs towards the S/P-GWs.

The current architectural model for Home-eNodeB (HeNB) access networks in 3GPP LTE are described below. HeNBs are the small cell base stations of LTE.

HeNB Architectural Models in 3GPP LTE

Figure 3:
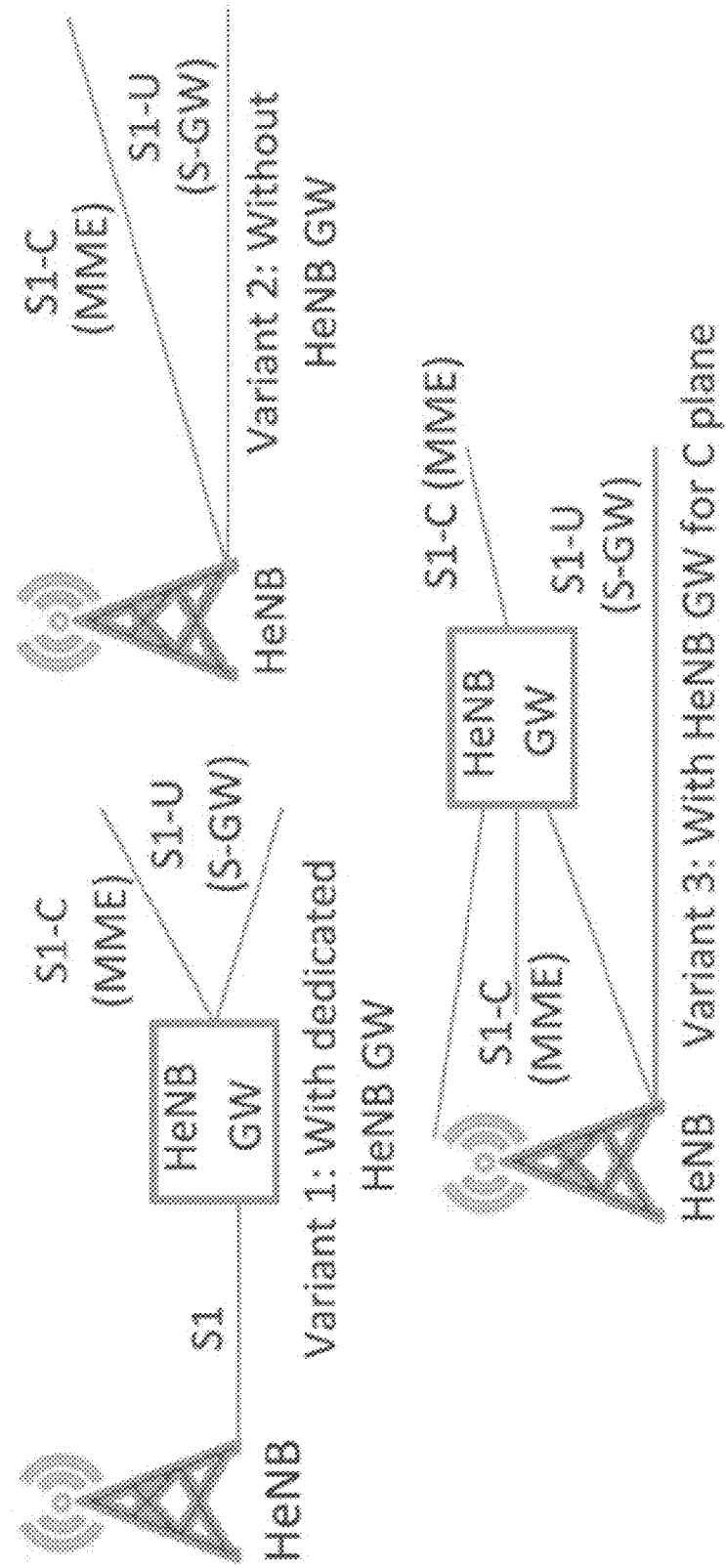
FIG. 3 is a simplified illustration showing a Home-eNodeB (HeNB) architectural models in 3 GPP LTE, according to one aspect of the present disclosure.

FIG. 3 shows the 3GPP HeNB architectural models: 1) with dedicated HeNB-GateWay (HeNB-GW), 2) without HeNB-GW, and 3) with HeNB-GW for the control plane.

With Dedicated HeNB-GW: With a dedicated HeNB-GW, communication between the HeNB and the HeNB-GW is secured by a mandatory security gateway (Se-GW) network function. The HeNB-GW aggregates the control plane connections (S1-MME) and user plane connections (S1-U) of all HeNBs connected to the HeNB-GW to a single control and user plane connection. The HeNB gateway appears as a single eNB to the outside entities, such as S-GW and MME. In a similar way, the HeNB-GW appears as both an S-GW and an MME to the eNBs connected to the HeNB-GW. The numbers of ports required at the MME and S-GW are reduced through the aggregation at the HeNB-GW. The Sm-GW framework 100 is similar to the dedicated HeNB-GW architecture, in that the Sm-GW framework 100 aggregates the eNBs connections both physically and logically. In addition, the Sm-GW framework 100 flexibly allocates uplink transmission bitrates to small cell eNBs and allows for the adaptive allocation of operator uplink transmission bitrates to the Sm-GW framework 100 by the SDN orchestrator.

Without HeNB-GW: Deployments of HeNBs without the HeNB-GWs increase the requirements on the S-GW framework and MME to support large numbers of connections. Large deployments of small cells without gateway aggregation at the HeNBs would greatly increase the total network infrastructure cost.

With HeNB-GW for the Control Plane: HeNB control plane connections are terminated at the HeNB-GW and a single control plane connection is established from the HeNB gateway to the MME. Although the number of connections required at the MME is reduced due to the control plane aggregation at the HeNB-GW, data plane connections are still terminated directly at the S-GW, increasing requirements at the S-GW framework. The Se-GW framework typically secures the communication to and from the HeNB. In contrast, the Sm-GW framework 100 terminates all the control and data connections from HeNBs.

3GPP Network Sharing

Network sharing was introduced by 3GPP in Technical Specification TS 23.951 with the main motivation to share expensive radio spectrum resources among multiple operators. For instance, an operator without available spectrum in a particular geographic area can offer cellular services in the area through sharing the spectrum of another operator. In addition to spectrum sharing, 3GPP specifies core network sharing among multiple operators through a gateway core network (GWCN) configuration. GWCN configurations are statically pre-configured at deployment for fixed pre-planned core network sharing. Thus, GWCN sharing can achieve only limited statistical multiplexing gain as the sharing is based on the pre-configured QoS requirements of the eNB interface connections and not on the varying eNB traffic demands. Also, the GWCN configuration lacks a central entity for optimization of the resource allocations with global knowledge of the eNB traffic demands. In contrast, the Sm-GW framework 100 includes a central SDN orchestrator for optimized allocations of backhaul transmission resources according to the varying eNB traffic demands.

The fundamental protocol mechanisms and interfaces are described below that integrate the proposed Sm-GW framework 100 into the conventional LTE protocols.

LTE Protocol Modifications

Figure 4:
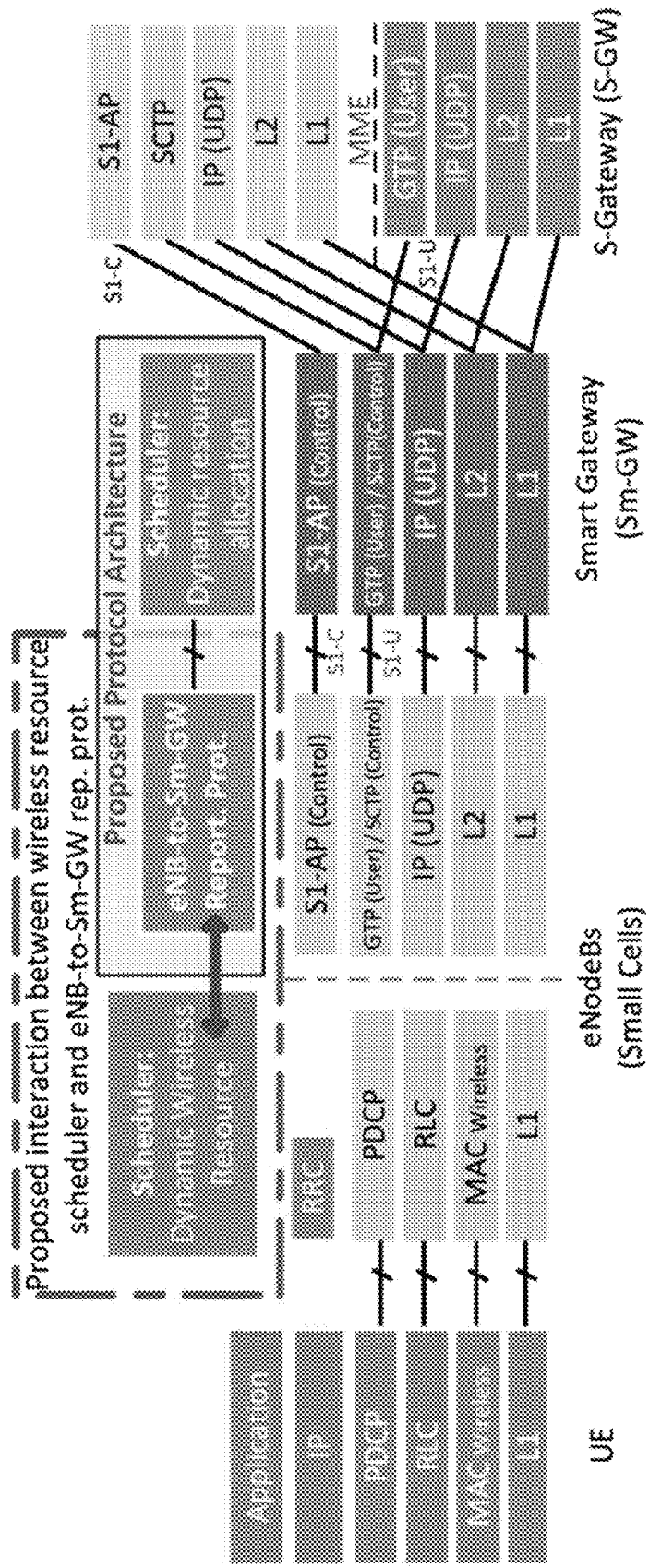
FIG. 4 is a simplified block diagram illustrating protocol mechanisms at eNB, Sm-GW and S-GW, according to one aspect of the present disclosure.

FIG. 4 illustrates the protocol mechanisms between a set of Ns eNBs and a given Sm-GW framework 100.

eNB: At the eNB, the eNB-to-Sm-GW framework 100 reporting protocol is introduced, which operates on top of the GPRS tunneling protocol (GTP) and stream control transmission protocol (SCTP). The reporting protocol (i) evaluates the required uplink transmission bitrate, and (ii) sends the bitrate request messages to the Sm-GW framework 100. The reporting protocol formulates the operator specific uplink transmission bitrate requests based on the requests of the UEs that are connected via the eNB to multiple operators o, o=1, 2, . . . , O.

The eNB wireless resource scheduler is responsible for the sharing of wireless resources between the eNB and the UEs. The eNB wireless resource scheduler ensures that only the resources available at the eNB are granted to the UEs. UEs periodically send buffer status reports (BSRs) to the eNB which they are connected to. Therefore, the eNB-to-Sm-GW framework 100 reporting protocol can estimate the UE traffic requirements by interacting with the wireless resource scheduler.

Smart Gateway (Sm-GW): The protocol stack at the Sm-GW framework 100 is similar to the HeNB-GW protocol stack. However, in the Sm-GW framework 100, an additional eNB coordination protocol, a scheduler for the dynamic resource allocation, and SDN capabilities are introduced.

The eNB coordination protocol collects request messages from eNBs. The eNB uplink transmission grants are sized based on the eNB requests and the available Sm-GW framework 100 resources according to the Sm-GW scheduling described herein. The eNB coordination protocol sends grant messages to all eNBs within a reasonable processing delay.

S1 based handovers for the downlink transmissions are typically anchored at the S-GW. (For the uplink transmissions, an anchoring, or buffering of packets, at a network entity, e.g., eNBs or S-GW, is not required.). The Sm-GW framework 100 will be transparent to all the downlink packets from the S-GW and hence not be limited by the network protocol scheduler. This ensures that the S1 based handover mechanisms at the S-GW and eNBs continue to function normally.

Figure 5:
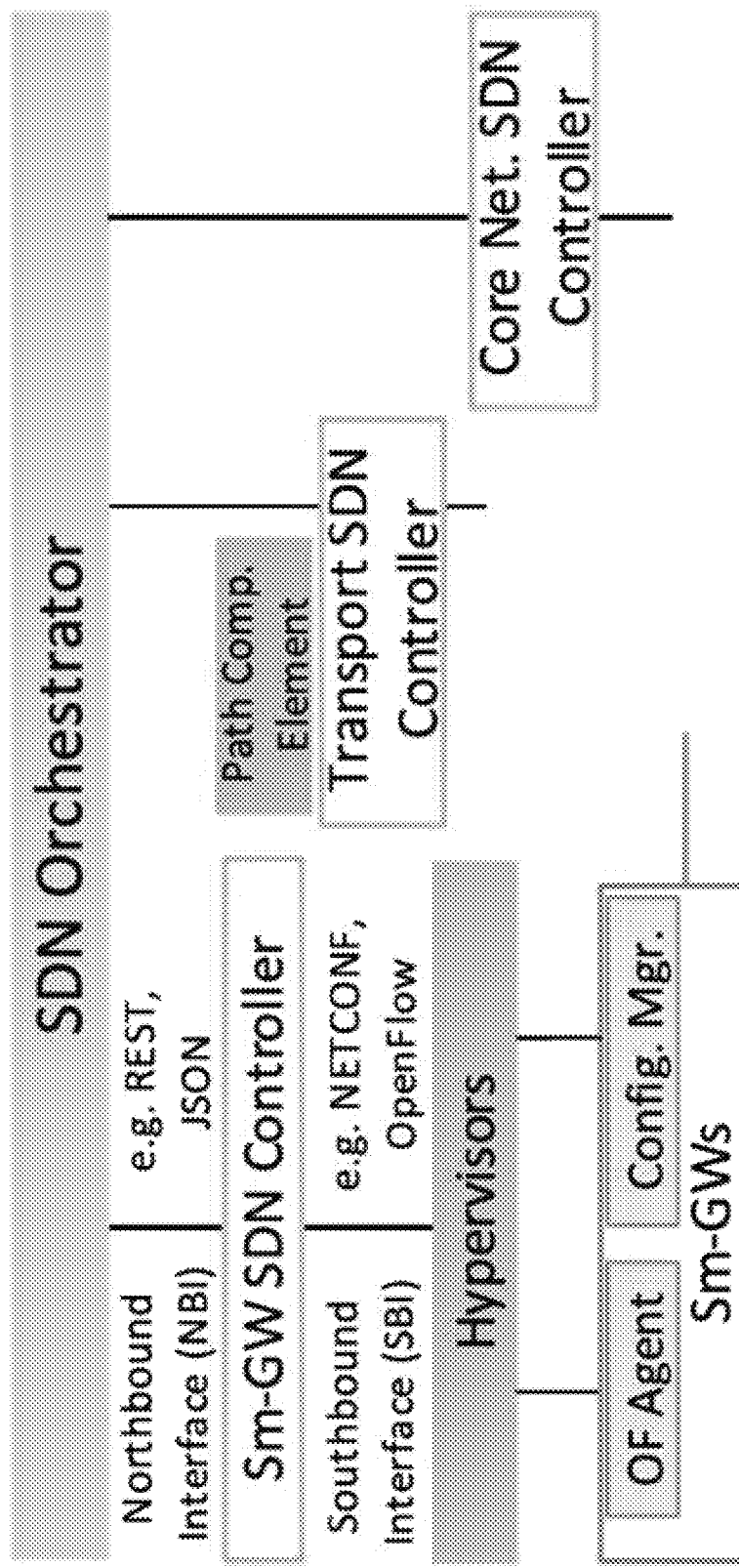
FIG. 5 is a simplified block diagram of Sm-GW embedding in the SDN ecosystem, according to one aspect of the present disclosure.
Figure 6:
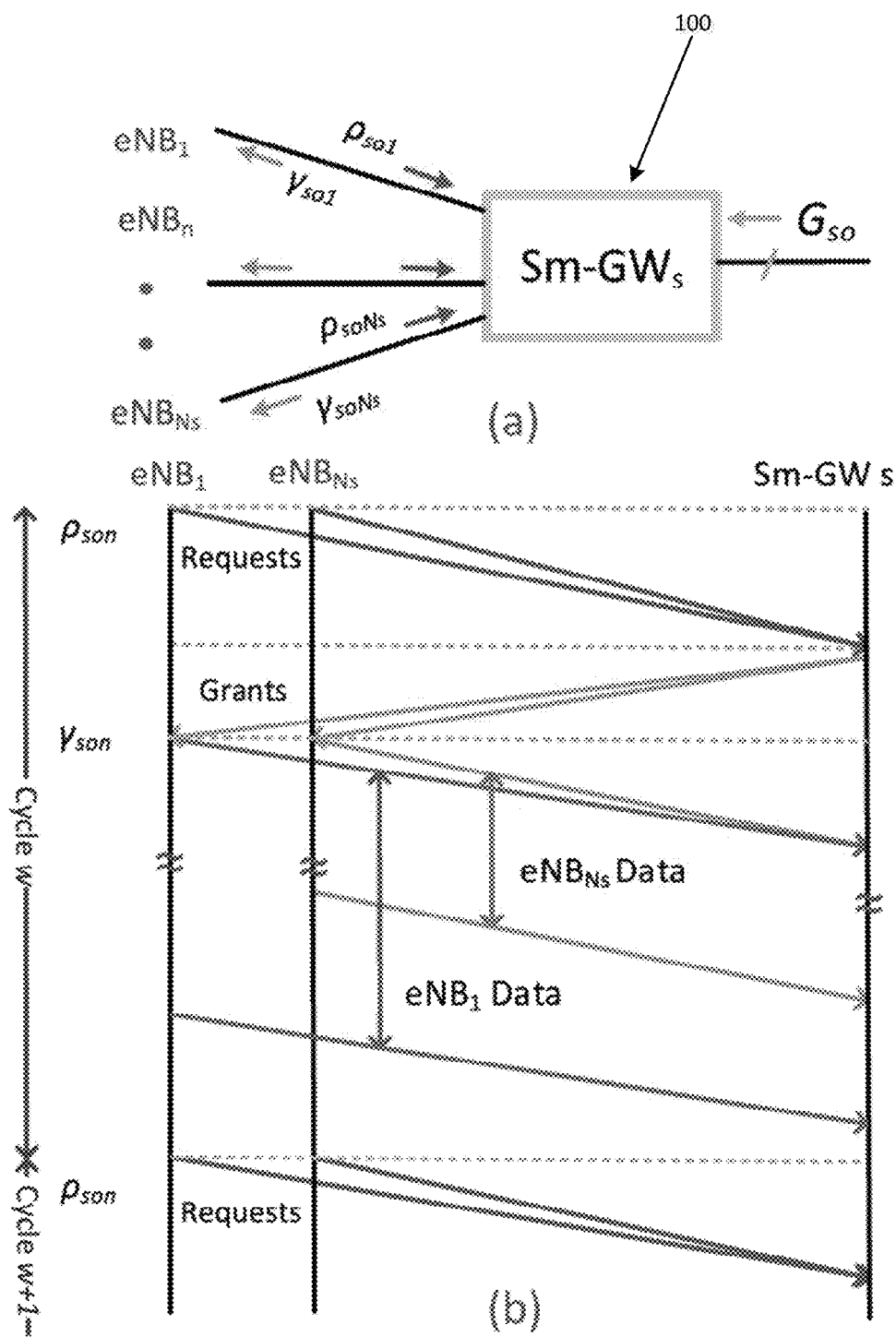
FIG. 6 is a graphical illustration of traffic adaptive Sm-GW scheduling, according to one aspect of the present disclosure.

SDN Operations of Sm-GW:

SDN infrastructure: The SDN capabilities of the Sm-GW framework 100 can be provided by an OpenFlow (OF) agent and/or a configuration manager at each Sm-GW framework 100 as illustrated in FIG. 5. OpenFlow is a popular protocol for the southbound interface (SBI) and can be employed on the SBI between the Sm-GW SDN controller and Sm-GW. The OpenFlow agent supports OpenFlow SDN functionalities at the Sm-GW framework 100, making the Sm-GW framework 100 configurable through the OpenFlow protocol. The Sm-GW configuration manager can be controlled by the Sm-GW SDN controller, e.g., through the NETCONF (or OpenFlow) SBI, to dynamically reconfigure the Sm-GW framework 100.

The Sm-GW SDN controller configures the Sm-GWs frameworks 100 to enable the internal LTE X2 tunnel interfaces among all connected small cell eNBs, as elaborated in Section 111-A4. Also, the Sm-GW SDN controller manages the external LTE X2 and S1 interfaces at the Sm-GW framework 100 through tunnel establishments to the external LTE network core entities, i.e., MMEs and S/P-GWs.

Whereas the conventional LTE transport network between the eNBs and S/P-GWs is configured with static MPLS/IP paths, the operation of the Sm-GW framework 100 requires a flexible transport network, which is controlled by a transport SDN controller, as illustrated in FIG. 5. The flexible transport network can, for instance, be implemented through a Software Defined Elastic Optical Network (SD-EON).

Sm-GW virtualization: The Sm-GW framework 100 can support a variety of virtualization strategies, e.g., to provide independent virtual networks for different operators. One example virtualization strategy could let the Sm-GWs frameworks 100 abstract the connected eNBs. Sm-GW frameworks 100 could then be abstracted by a hypervisor that intercepts the SBI, as illustrated in FIG. 5. Based on the operator configurations that are sent via the SDN orchestrator to the Sm-GW SDN controller, resources at the Sm-GW frameworks 100 and the small cell eNBs (which are privately owned by an organization) can be sliced to form operator-specific virtual networks of Sm-GW frameworks 100 and eNBs. The configuration manager at each Sm-GW framework 100 can allocate resources to each of these virtual networks.

From the operator perspective, the Sm-GW virtualization essentially allows multiple operators to share the physical small cell infrastructure of Sm-GWs frameworks 100 and eNBs. Thus, simultaneous services can be enabled to large UE populations that belong to multiple operators, i.e., that have contracts with multiple operators, while using the same physical small cell infrastructure. Existing conventional cellular deployment structures do not support the infrastructure sharing among multiple operators.

SDN orchestration: The SDN orchestrator coordinates the network management across multiple domains of Sm-GWs frameworks 100 (whereby each Sm-GW domain is controlled by its own Sm-GW SDN controller), transport networks, and core networks. The SDN orchestrator implements the multi-operator management introduced below and configures the Sm-GWs frameworks 100 and transport networks based on global multi-operator network optimizations. For example, the SDN orchestrator communicates with the path computation element (PCE) SDN application on the transport SDN controller. The PCE dynamically evaluates the label switched paths, such as MPLS/IP paths, so as to flexibly enable and reconfigure the transport network.

LTE X2 Interfaces of eNBs With Sm-GW: X2 interfaces enable critical functionalities in LTE small cells, such as X2-based handover as well as interference coordination and mitigation. Typically, each eNB connected to a given Sm-GW framework 100 pertaining to an operator shares the same MME; thus, each eNB needs an X2 interface to all other eNBs within the same MME coverage area, the so-called tracking area. Hence, eNBs connected to an Sm-GW must be interconnected with X2 interfaces.

To external macro-eNBs: X2 traffic flows destined to eNBs located outside the scope of a Sm-GW framework 100 (typically to a macro-eNB) are not limited by the scheduler at the Sm-GW framework 100. X2 packets flow out of the Sm-GW framework 100 into the backhaul (i.e., to an S-GW) as they originate at the eNBs. The Sm-GW framework 100 appears as an external router (or gateway) to the X2 external interfaces.

To internal small-eNBs: The Sm-GW framework 100 appears as a simple bridge or a router to the internal X2 interfaces, routing the internal X2 packets within. Therefore, the scheduler at the Sm-GW framework 100 does not limit any X2 packets. For small cell deployments, an eNB can have multiple neighboring eNBs in the tracking area; these neighboring eNBs need to be interconnected with each other with X2 connections. On the order of $O(N(N-1))$ dedicated links would be required to interconnect the X2 interfaces of N eNBs in the tracking area in a full mesh topology. In contrast, a star topology with the Sm-GW framework 100 at the center requires only $O(N)$ connections to connect each eNB to the Sm-GW framework 100. In summary, in the Sm-GW framework 100 architecture, the Sm-GW framework 100 manages the X2 interfaces of all the internal small cell eNBs, thus eliminating the distributed management of X2 interfaces at each eNB.

Authentication of Sm-GW With EPC Core: Typically HeNBs use IPSec tunneling for their security and encryption, which creates overhead. If Sm-GWs frameworks 100 are authenticated, the HeNBs would no longer need IPsec tunneling. Specifically, upon boot-up, the Sm-GW framework 100 is authenticated with an LTE Evolved Packet Core (EPC) so as to eliminate the need for a network security-gateway (Se-GW) function or IPsec tunneling between the eNBs and the P-GWs. Critical cellular network functions, such as security, authentication, and reliability, require additional effort to be enabled in WiFi networks. WiFi Passpoint [47] (Hotspot 2.0) aims at providing an experience similar to cellular connectivity in WiFi networks by providing the cellular authentication mechanisms. With the authentication of Sm-GWs frameworks 100, the simplicity of WiFi networks can be achieved by the small cell cellular networks.

Downlink vs. Uplink Communication

Downlink Packets at the Sm-GW: Traffic flows in the conventional downlink path from an S/P-GW to an eNB are typically sent at rates that do not exceed the wireless transmission rates from the eNB to the UE devices. Thus, as long as the link rates from the S/P-GW to the inserted Sm-GW and from the Sm-GW framework 100 to the eNB are at least as high as the conventional S/P-GW to eNB links, the Sm-GW framework 100 can be transparent to the downlink packets from the S/P-GW.

TABLE I

SUMMARY OF NOTATION OF SM-GW NETWORK MANAGEMENT

| | Sm-GW Sched. Framework (Sm-GW ↔ eNBs), Sec. IV |
|---|---|
| $N_s$ | Number of small cell eNBs at Sm-GW s |
| $G_{so}$ | Available uplink transm. bitrate [bits/s] fom Sm-GW s to operator o |
| W | Duration [s] of scheduling cycle |
| $\Gamma_{so}$ | = $G_{so}W/N_s$, Max. eNB uplink transm. data amount [bit] per cycle with equal sharing |
| $\rho_{son}$ | Data amount [bit] that eNB n at Sm-GW s wants to transmit to operator o in a cycle, i.e., request by eNB n |
| $\gamma_{son}$ | Data amount [bit] that eNB n at Sm-GW s is allowed to transmit to operator o in a cycle, i.e., grant by Sm-GW s |
| | SDN Based Multi-Operator Managm. Framework, Sec. V (Sm-GWs ↔ Operator Gateways) |
| o | Index of operators, o = 1, 2, . . . , O |
| s | Index of Sm-GWs, s = 1, 2, . . . , S |
| $R_{so}$ | Smoothed uplink transmission bitrate [bit/s] request from Sm-Gw s to operator o |
| $K_o$ | Max. available uplink transm. bitrate through operator o |
| $G_{so}$ | Granted uplink transm. bitrate from Sm-GW s to operator o |
| $X_{so}$ | Actual uplink traffic bitrate from Sm-GW s to operator o |

Uplink Packets at Sm-GW: In contrast to the downlink data traffic, the uplink data traffic from the eNBs to an Sm-GW framework 100 needs to be regulated as the traffic flows from all the eNBs terminating at the Sm-GW framework 100 can overwhelm the outgoing link towards the operator S-GW. Enforcing QoS strategies and fairness among eNBs requires scheduling of the uplink packet traffic arriving from the eNBs at a Sm-GW framework 100. Therefore, focus is on frameworks for the uplink transmission scheduling of the communication (i) from eNBs to an Sm-GW, and (ii) from Sm-GWs to S-GWs.

SM-GW Scheduling Framework

The main purpose of the Sm-GW scheduling framework is to maximize the utilization of the network resources, and to ensure fair uplink transmission service for all eNBs connected to a Sm-GW framework 100. Without scheduling, highly loaded eNBs can impair the service for lightly loaded eNBs connected to the same Sm-GW framework 100. When many eNBs are flexibly connected to a Sm-GW framework 100, traffic bursts from heavily loaded eNBs can overwhelm the queue of a Sm-GW framework 100, resulting in excessive packet drops and high delays, even for lightly loaded eNBs. On the other hand, with scheduling, a large number of eNBs can be flexibly connected to the Sm-GW framework 100 while ensuring prescribed QoS and fairness levels. Each eNB can possibly have a different service level agreement. The Sm-GW framework 100 allows for the flexible deployment of a wide variety of scheduling algorithms. Two classes of Sm-GW scheduling algorithms are outlined, and illustrate an elementary algorithm for each class. Table I summarizes the main Sm-GW framework 100 notations.

Configuration Adaptive Scheduling

Configuration adaptive scheduling adapts the scheduling, i.e., the allocation of uplink transmission bitrates, according to the number of eNBs connected to a given Sm-GW framework 100. The Sm-GW framework 100 tracks the number of connected eNBs and sends a configuration message to all eNBs in the event of a change in connectivity at the Sm-GW framework 100, i.e., addition of new eNB or disconnection of existing eNB. More specifically, consider $N_s$ eNBs at a given Sm-GW s framework 100 that has been allocated the uplink transmission bitrate $G_{so}$ [bit/s] toward a given operator o (through the coordination techniques discussed below).

An elementary equal share scheduling shares the available uplink transmission bitrate at the Sm-GW framework 100 toward a given operator o equally among all eNBs connected to the Sm-GW framework 100. Each eNB n, n=1, 2, ..., $N_s$, can then transmit at most $\Gamma_{so}=G_{so}W/N_s$ [Byte] of traffic during a cycle of duration W [seconds]. The traffic amount limit $\Gamma_{so}$ and cycle duration W are sent to the eNBs as a part of the initial configuration message. Each eNB schedules the uplink transmissions such that no more than $\Gamma_{so}$ [Byte] of traffic are send in a cycle of duration W [seconds].

The simple equal share scheduler can flexibly accommodate large numbers $N_s$ of eNBs. However, the equal bandwidth assignments by the elementary equal share scheduler to the eNBs under-utilize the network resources when some eNBs have very little traffic while other eNBs have high traffic loads.

Traffic Adaptive Scheduling

With traffic adaptive scheduling, the Sm-GW framework 100 collects uplink transmission requests from the eNBs. The Sm-GW framework 100 then adaptively allocates portions of the uplink transmission bitrate $G_{so}$ to the individual eNBs according to their requests. Traffic adaptive scheduling operates with a request-allocate-transmit cycle of duration W [seconds] illustrated in FIG. 6. At the start of the cycle, each eNB n, n=1, 2, ..., $N_s$, sends an uplink transmission bitrate request to Sm-GW s frameworks 100. $\rho_{son}$ denotes the amount of traffic [in Byte] that eNB n wants to transmit to operator o over the next cycle of duration W. Once all requests have been received, i.e., following the principles of the offline scheduling framework, portions of $G_{so}$ can be allocated to the eNBs according to some scheduling policy.

An elementary excess share scheduling policy allocates the eNB grants as follows. Lightly loaded eNBs with $\rho_{son} < \Gamma_{so}$ are granted their full request, i.e., receive the grant size $\gamma_{son} = \rho_{son}$, while their unused (excess) portion of the equal share allocation is accumulated in an excess pool:

$$\xi = \sum_{\forall \rho_{son} \leq \Gamma_{so}} \Gamma_{so} - \rho_{son}. \tag{1}$$

Following the principles of controlled equitable excess allocation, highly loaded eNBs are allocated an equal share of the excess up to their request. That is, with highly loaded eNBs, the grants are $$\gamma_{son} = \min\left(\rho_{son}, \Gamma_{so} + \frac{\xi}{|\mathcal{H}|}\right). \tag{2}$$

Scheduling Fairness

Within the context of the Sm-GW scheduling framework 200, fairness is the measure of network accessibility of all $N_s$ eNBs connected to an Sm-GW s based on individual eNB uplink throughput level requirements. $T_{son}$ denotes the long-run average throughput level [bit/s] of uplink traffic generated at eNB n, n=1, 2, ..., $N_s$, at Sm-GW s framework 100 for operator o. The throughput level $T_{son}$ can for instance be obtained through smoothing of the requests $\rho_{son}$ over successive cycles w. In order to avoid clutter, the subscripts s and o are omitted in the remainder of this fairness evaluation. The following fair target throughput levels $\Omega_n$ [bit/s] are defined as: Lightly loaded eNBs $l \in \mathcal{L}$ with throughput levels $T_l < \Gamma/W$, should be able to transmit their full traffic load, i.e., $\Omega_l = T_l$. Next, consider highly loaded eNBs $A \in \mathcal{H}$ with throughput levels $T_h > \Gamma/W$. If the total throughput requirement of all eNBs $\Sigma_{l \in L} T_l + \Sigma_{h \in H} T_h$ is less than or equal to the uplink transmission bitrate G, then the highly loaded eNBs should be able to transmit their full traffic load, i.e., $\Omega_n = T_h$. On the other hand, if the total traffic load exceeds the uplink transmission bitrate, i.e., if $\Sigma_{l \in L} T_l + \Sigma_{h \in H} T_h > G$, then the highly loaded eNBs should be able to transmit traffic up to an equitable share of the uplink transmission bitrate not used by the lightly loaded eNBs. Thus, overall: $\Omega_h = \min(T_h, (G - \Sigma_{l \in L} T_l)/|\mathcal{H}|)$. The normalized distance $\mathcal{E}_n$ of the actually achieved (observed) throughput $\tau_n$ and the target throughput $\Omega_n$ is defined for example, $\mathcal{E}_n = t_n - \Omega_n$.

Based on the preceding target throughput definitions, the normalized distance throughput fairness index is:

$$\mathcal{F}_T = \frac{\sqrt{\Sigma_{n=1}^N \mathcal{E}_n^2}}{\sqrt{\Sigma_{n=1}^N \Omega_n^2}}, \tag{3}$$

whereby $\mathcal{F}_T$ close to zero indicates fair Sm-GW scheduling.

Sm-GW Scheduling Overhead

In configuration adaptive Sm-GW scheduling, a reconfiguration event, i.e., an eNB connect or disconnect event, triggers the re-evaluation of the grant size limit $\Gamma_{so}$. The new $\Gamma_{so}$ value is sent to all eNBs. Since reconfiguration events occur typically only rarely, e.g., on the time scale of minutes or hours, the overhead for configuration adaptive scheduling is negligible.

Traffic adaptive Sm-GW scheduling requires each eNB n to send a request every cycle of duration W seconds. Upon reception of the requests from all $N_s$ eNBs, the Sm-GW framework 100 evaluates and sends the grants to the respective eNBs, as illustrated in FIG. 6A. The requests and grants can typically be sent simultaneously, i.e., in parallel, over the individual eNB-to-Sm-GW links. Thus, within a cycle duration W, the overhead amounts to the transmission delays of the request and grant messages, the maximum round-trip propagation delay between eNBs and Sm-GW framework 100, and the schedule processing delay at the Sm-GW framework 100. For typical parameter settings, such as 70 Byte messages transmitted at 1 Gbps, up to 500 m eNB-to-Sm-GW propagation distance, W=1 ms cycle duration, and schedule processing delay on the order of microseconds, the overhead is less than half a percent.

Evaluation of Sm-GW Scheduling

Simulation Setup: The performance of Sm-GW scheduling was evaluated with the discrete event simulator OMNET$_{++}$. A given Sm-GW s framework 100 was considered with an uplink transmission bitrate to a given operator o of $G_{so}$=1 Gbps. The subscripts s and o are omitted in the remainder of this evaluation section to avoid notational clutter. The LTE access network typically requires the packet delay to be less than 50 ms. The Sm-GW queue size is set to 20 MBytes, which is equivalent to a maximum queuing delay of 20 ms over the G=1 Gbps link. Without any specific scheduling, the Sm-GW framework 100 operates in first-come-first-served mode with taildrop.

The typical bursty eNB traffic generation pattern is simulated, with two eNB traffic rate states: low and heavy. The sojourn time in a given traffic rate state is randomly drawn from a uniform distribution over 1 ms to 4 ms. At the end of the sojourn time, a switch to another state occurs with a probability of 70% in the low traffic state and 30% in the heavy traffic state. The traffic bitrate ratio between the heavy and low traffic states is 4:1. Within a given traffic rate state, data packets are randomly generated according to independent Poisson processes.

$|\mathcal{L}|$=10 is considered lightly loaded eNBs and $|\mathcal{H}|$=10 is considered highly loaded eNBs connected to the considered Sm-GW. Each eNB, irrespective of whether it is lightly or highly loaded, generates traffic according to the two traffic rate state (low and heavy) model. The low and heavy traffic rates are set such that the long-run average generated traffic rate corresponds to a prescribed required throughput (load) level $T_L$<G/N=50 Mbps for a lightly loaded eNB and a prescribed required throughput (load) level $T_H$>G/N for a highly loaded eNB. For all simulations, the 95% confidence intervals are less than 5% of the corresponding sample mean.

Figure 7B:
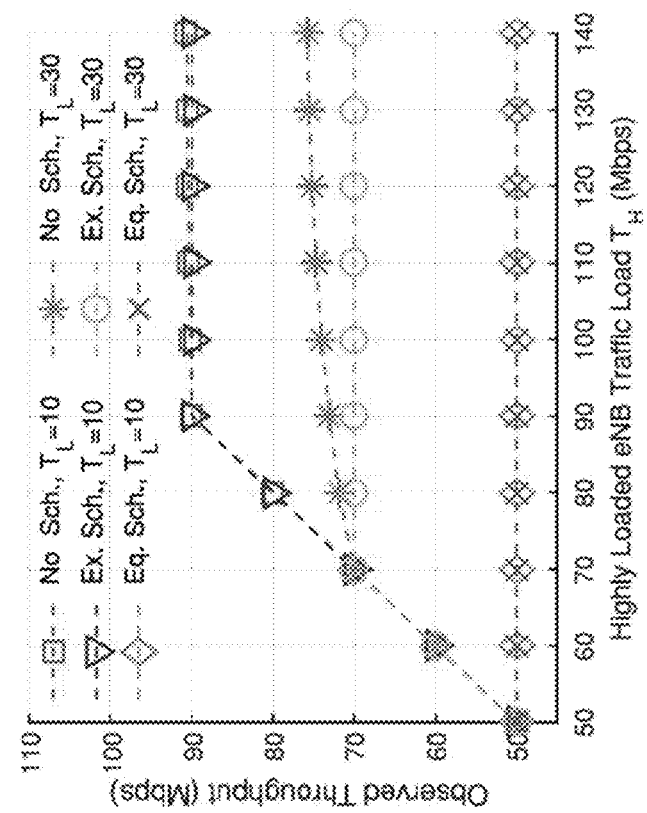
FIGS. 7A-7D show simulation results for Sm-GW scheduling, according to one aspect of the present disclosure.
Figure 7A:
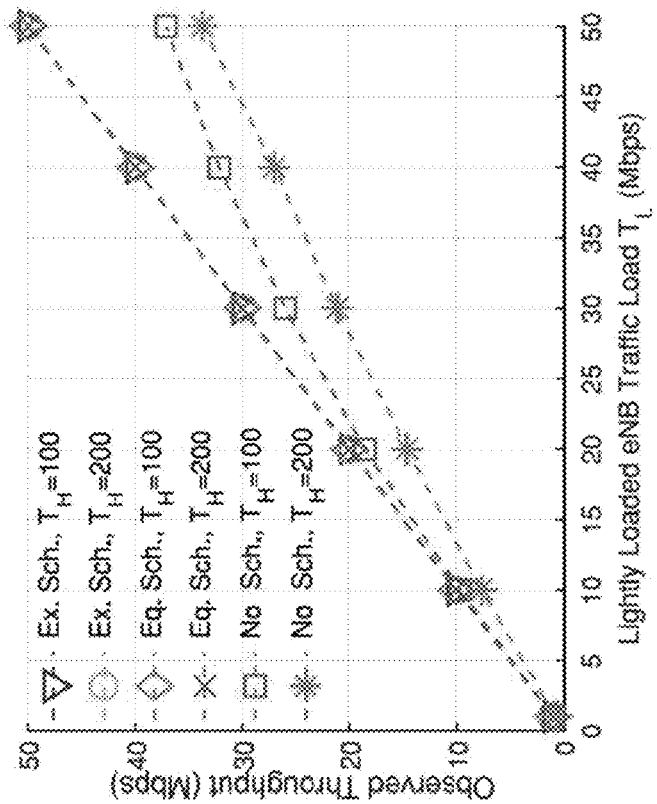
Figure 7D:
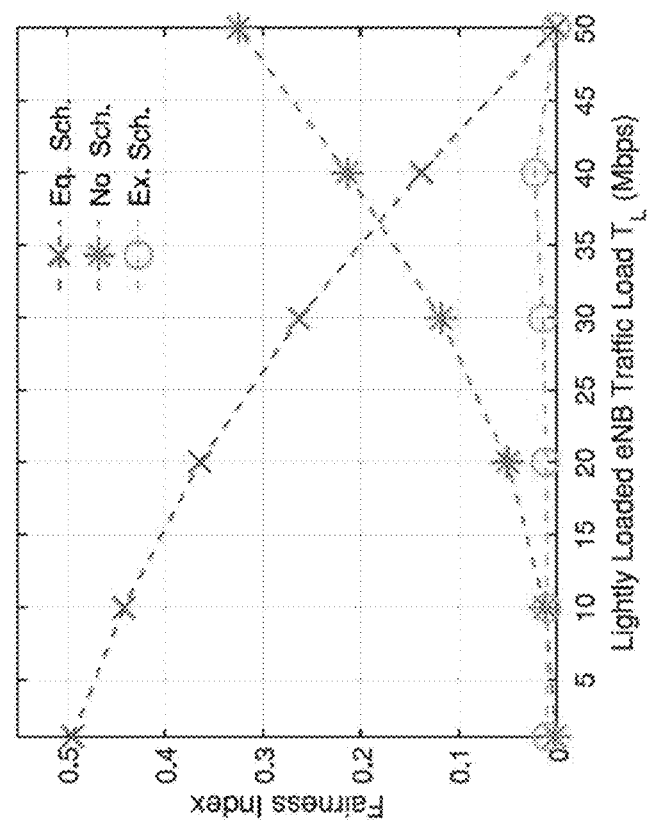
Figure 7C:
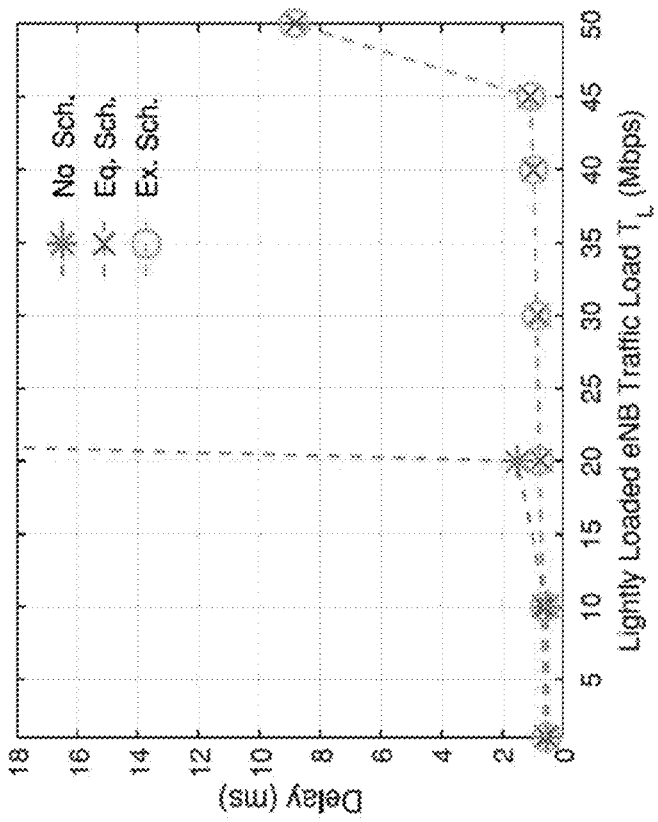

Simulation Results:

Without Sm-GW scheduling: In FIG. 7, we show representative evaluation results comparing configuration adaptive equal-share Sm-GW scheduling and traffic adaptive excess-share Sm-GW scheduling with the conventional back-haul without Sm-GW scheduling. FIGS. 7A and 7B show the actual (achieved, observed) throughput τ of lightly loaded and highly loaded eNBs, respectively, as a function of the generated lightly loaded ($T_L$) and highly loaded ($T_H$) throughput levels. We observe from FIG. 7A that without scheduling, the lightly loaded eNB suffer reductions in the achieved throughput, that are especially pronounced (over 30%) for the high $T_H$=200 Mbps load of the highly loaded eNBs. At the same time, we observe from FIG. 7B that without scheduling, the highly loaded eNBs achieve more than their fair share. For instance, for the highly loaded eNB throughput requirement (load) $T_H$=140 Mbps, and $T_L$=30 Mbps, the observed throughout of the highly loaded eNBs is $T_H$=76 Mbps, which is significantly higher than the fair share of (G−$|\mathcal{L}|T_L$)/$|\mathcal{H}|$=70 Mbps. The unfairness arising without scheduling is further illustrated in FIG. 7C, where we observe a sharp delay increase at $T_L$=20 Mbps, when the total traffic load $\mathcal{L}T_L$+$|\mathcal{H}|T_H$ approaches the uplink transmission bitrate G. Moreover, from FIG. 7D, we observe an increasing fairness index $\mathcal{F}$ as the lightly loaded eNBs generate more traffic, i.e., as $T_L$ increases. That is, as the lightly loaded eNBs try to transmit more traffic, their achieved throughput falls more and more below their fair share [see growing divergence between the no scheduling curves and straight lines for scheduling in FIG. 7A], leading to increasingly unfair treatment of the lightly loaded eNBs.

Equal-share Sm-GW scheduling: It is observed from FIG. 7A and FIG. 7C that lightly loaded eNBs benefit from equal-share scheduling in that they get the full share of their fair target throughput and experience low delay. However, it is observed from FIG. 7B that highly loaded eNBs achieve only a throughput of G/($|\mathcal{L}|$+$|\mathcal{H}|$)=50 Mbps as equal-share Sm-GW scheduling assigns a configuration adaptive allocation of equal shares of the limited uplink transmission bitrate G to all eNBs irrespective of their traffic generation rates. Correspondingly, it is observed from FIG. 7D, a high fairness index $\mathcal{F}$ for low traffic loads of the lightly loaded eNBs, as the highly loaded eNBs receive only unfairly small shares of the uplink transmission bitrate G.

Excess-share Sm-GW scheduling: We observe from FIGS. 7A and 7B that with excess-share Sm-GW scheduling, both lightly loaded eNBs and highly loaded eNBs achieve their fair target throughput. We further observe from FIGS. 7C and 7D that excess-share Sm-GW scheduling gives also favorable delay and fairness index performance.

Summary: We conclude that scheduling of the Sm-GW uplink transmission bitrate G is necessary to prevent backhaul bandwidth starvation of lightly loaded eNBs due to the overwhelming traffic rates of highly loaded eNBs. On the other hand, simple configuration adaptive allocation of equal uplink transmission bitrate shares to each eNB wastes bandwidth. Flexible traffic adaptive scheduling according to the traffic loads of the eNBs, e.g., through excess-share scheduling, can ensure fairness while efficiently utilizing the uplink transmission bitrate.

SDN Based Multi-Operator Management

A novel SDN based network management framework for flexible sharing of the backhaul resources of multiple operators is discussed. The proposed multi-operator management framework accommodates dynamic changes of the traffic requirements of the small cells, such as changes of the generated uplink traffic bitrates, as well as dynamic changes of the operator characteristics, such as changes of the available uplink traffic bitrates. In the multi-operator management framework, an SDN orchestrator dynamically configures the Sm-GWs frameworks 100 and the transport network connecting the Sm-GWs frameworks 100 to the operator gateways to flexibly adapt to changes in small cell traffic loads and the operator characteristics.

Request and Allocation Procedures

In a small cell deployment environment, such as a large organization, multiple Sm-GWs frameworks 100 can serve multiple buildings. For example, in a university setting, a library can be equipped with the Sm-GW framework 100 and the administration building can be equipped with another Sm-GW framework 100. The throughput requirements and priorities of these buildings typically vary widely over time. For instance, the administration building experiences a large visitor influx during graduation and student admission periods, while many students visit the library during exam week. Moreover, services from multiple operators may need to be shared among the buildings in a given organization, i.e., among multiple Sm-GWs frameworks 100. Hence, there is a need for highly flexible traffic management within the large organization based on time-varying priorities and throughput requirements.

Figure 8:
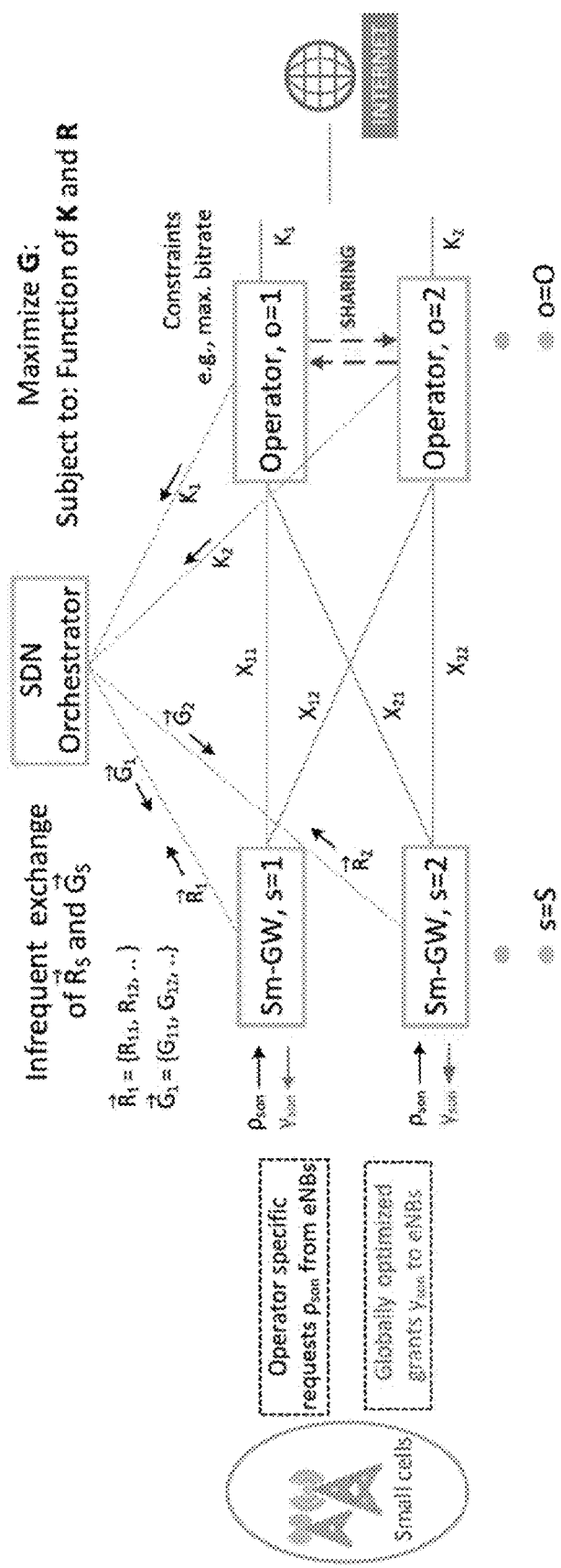
FIG. 8 is a simplified illustration of SDN based multiple operator management serving multiple Sm-GWs, according to one aspect of the present disclosure.

Suppose, the Sm-GWs frameworks 100 s, s=1, 2, ..., S, and operators o, o=1, 2, ..., O, are interconnected in a full mesh transport network, as illustrated in FIG. 8. As described below, with traffic adaptive Sm-GW scheduling, each eNB n sends its operator o specific uplink transmission bitrate request to Sm-GW s framework 100 in every cycle. The requested uplink transmission data amounts typically vary over time scales that are long enough to reasonably permit adaptations of the Sm-GW configurations. For instance, the requests will typically change on the time scales of several seconds or minutes, or possibly even longer, such as the seasonal variations in the visitor volume to university buildings. In order to obtain the variational characteristics of the eNB requirements, the operator specific requests at the Sm-GWs frameworks 100 can be aggregated over the eNBs and appropriately smoothed, i.e., averaged over time, to obtain an aggregate smoothed uplink transmission bitrate request $R_{so}$ [bit/s] from Sm-GW s framework 100 to operator o.

Ideally, the backhaul network should adapt to varying requirements at the Sm-GWs frameworks 100 to maximize the network utilization. We exploit the centralized control property of SDN to adaptively configure the network for variable requirements. More specifically, the SDN orchestrator in FIG. 8 optimizes the allocations $G_{so}$ of operator o uplink transmission bitrate [bit/s] to the individual Sm-GWs s frameworks 100. The SDN orchestrator thus ensures that the grants to the eNBs are globally maximized (subject to the operators' constraints and requirements). When the optimized allocations $G_{so}$ are used at the Sm-GW schedulers, the maximum allowed traffic flow is sent from the Sm-GWs frameworks 100 to each operator core.

Optimization Decision Variables and Constraints for Multi-Operator Management with SM-GWS A general optimization model is defined for the multi-operator management framework. Specifically, the constraints and decision variables are defined for optimizing the multi-operator management. The defined decision variables and constraints are employed for the operation of the SDN orchestrator. The SDN orchestrator can employ arbitrary objective functions and constraint allocation strategies for the optimization, as illustrated for an elementary.

Constraints: Requests for the uplink transmission of $\rho_{son}$ [bits] from eNBs n, n=1, 2, ..., $N_s$, arrive at the framework 100 s, s=1, 2, ..., S, every cycle of duration W seconds, i.e., on the order of milliseconds, requesting uplink transmission bitrates from operator o, o=1, 2, ..., O. The Sm-GW framework 100 aggregates the requests over the eNBs n and smooths the aggregated requests to obtain the smoothed aggregated requests $R_{so}$. Denoting w for the cycle index, an elementary weighted sampling smoothing computes $$R_{so}(w) = \alpha \left( \frac{1}{N_s} \sum_{n=1}^{N_s} \frac{\rho_{son}(w)}{W} \right) + (1-\alpha) R_{so}(w-1), \quad (4)$$

where α denotes the weight for the most recent request sample. A wide variety of other smoothing mechanism can be employed and optimized according to the specific deployment settings. The smoothed requests $R_{so}$ are periodically (with a period typically much longer than the eNB reporting window) sent to the SDN orchestrator. In particular, each Sm-GW s framework 100, sends a vector of smoothed requests $\vec{R}_s = [R_{s1} R_{s2} \ldots R_{sO}]$ containing the aggregated and smoothed requests for each operator o to the SDN orchestrator. The SDN orchestrator combines the request vectors $\vec{R}_s$ to form the request matrix $$R = [R_{so}], s=1,2,\ldots,S; o=1,2,\ldots,O. \quad (5)$$

Each operator o, o=1, 2, ..., O, can enforce a set of constraints $K_{oes}$, c=1, 2, ..., c, represented by a constraint vector $\vec{K}_c = [K_{c1} K_{c2} \ldots K_{cC}]$ that is sent to the SDN orchestrator. Each constraint c may be associated with a particular specification from operator o, e.g., for traffic shaping of the flows or for the aggregate maximum bitrate. In order to avoid clutter and not to obscure the main ideas of our overall multi-operator management framework, we consider in this study a single constraint for each operator o. That is, in place of the constraint vector $\vec{K}_o$ we consider a single (scalar) constraint $K_o$. The SDN orchestrator combines the scalar constraints from the various operators o to form the constraint vector $$K = [K_1 K_2 \ldots K_O]. \quad (6)$$

Decision Variables: The Sm-GW s framework 100 scheduler uses the operator o specific grant size limits $\Gamma_{so}$ to schedule/assign uplink transmission grants to eNBs (see Sections IV-B and IV-C). By controlling the variable $\Gamma_{so}$ specific to operator o we can control the flow of traffic outward from the Sm-GW framework 100, i.e., towards the respective operator o. The long-term average traffic flow rates $X_{so}$ [bit/s] from the Sm-GWs frameworks 100 s, s=1, 2, ..., S, to the operators o, o=1, 2, ..., O, can be expressed as matrix $$X = [X_{so}], s=1,2,\ldots,S; o=1,2,\ldots,O. \quad (7)$$

The operator o specific uplink transmission bitrates $G_{so}$ granted to the Sm-GWs frameworks 100 are evaluated at the SDN orchestrator, based on the request matrix R and the constraint vector K. The orchestrator responds to the request vector $\vec{R}_x$ from each Sm-GW s framework 100 with a grant vector $\vec{G}_x$. At the SDN orchestrator, the grant vectors $\vec{G}_x$ can be combined to form the orchestrator grant matrix $$G = [G_{so}], s=1,2,\ldots,S; o=1,2,\ldots,O. \quad (8)$$

G is a positive (non-negative) matrix, since the matrix elements $G_{so}$, $G_{so} \geq 0$, correspond to granted uplink transmission bitrates.

The objective is to maximize the traffic flow rates $X_{so}$ from the Sm-GWs s to the operators o subject to the operator constraints K. In particular, the aggregated traffic sent from the Sm-GWs s, s=1, 2, ..., S, to the operator o core should satisfy the operator constraint $K_o$, i.e., $$\sum_{s=1}^{S} X_{SO} \leq K_O, \forall o, o = 1, 2, \ldots, O. \quad (9)$$

Using the grant vector $\vec{G}_x$ at Sm-GW s to assign, i.e., to schedule, uplink traffic grants to the eNBs (see Section IV) ensures that the traffic flow rates $X_{so}$ from Sm-GW s to operator o are bounded by $G_{so}$, i.e., $$X_{so} \leq G_{so}. \forall (s,o). \quad (10)$$

Thus, in order to ensure that the traffic flows $X_{so}$ satisfy the operator constraints K, the grants $G_{so}$ must satisfy the operator constraints, i.e., $$\sum_{s=1}^{S} G_{SO} \leq K_O, \forall o, o = 1, 2, \ldots, O. \quad (11)$$

In order to maximize the traffic flows $X_{so}$ to each operator o, the SDN orchestrator needs to grant each Sm-GW s framework 100 the maximum permissible uplink transmission bitrate $G_{so}$.

---
Algorithm 1: SDN Orchestrator Procedure
---
1. Sm-GWs
  (a) Evaluate aggregate smoothed requests $R_{so}$ from eNB requests $\rho_{san}$, Eqn. (4)
  (b) Periodically send request vector $\vec{R}_s$ to SDN orchestrator
  if Grant vector $\vec{G}_s$ is received then
  | Update Sm-GW (to eNBs) grant size limits $\Gamma_{sa}$
  end
2. Operators
  (a) Send constraint $K_o$ to SDN orchestrator
3. SDN Orchestrator
  if Request vector $\vec{R}_s$ is received OR constraint $K_o$ is received then
  | Re-optimize orchestrator (to Sm-GW) grants G
  | Send grant vector $\vec{G}_s$ to Sm-GW s
  end
---

SDN Orchestrator Operation

The operational procedures for evaluating the SDN orchestrator grant matrix G (8) are executed in parallel in the Sm-GWs frameworks 100, operators, and the SDN orchestrator, as summarized in Algorithm 1. The Sm-GWs frameworks 100 aggregate and smooth the eNB requests and periodically send the request vector $\vec{R}_x$ to the SDN orchestrator. The SDN orchestrator optimizes the grant matrix G upon the arrival of a new Sm-GW request vector $\vec{R}_s$ or a change in an operator constraint $K_o$. The orchestrator updates the Sm-GWs with the newly evaluated orchestrator grant vectors $\vec{G}_s$, which update their grant size limits $\Gamma_{so}$.

Our SDN based multi-operator management framework allows for a wide variety of resource (uplink transmission bitrate) allocations from the multiple operators to the Sm-GWs frameworks 100. In order to illustrate the SDN based multi-operator management framework, an elementary specific optimization problem formulation is considered with a linear objective function and a proportional constraint allocation strategy that allocates the uplink transmission bitrate constraints proportional to the requests. More complex objective functions and allocation strategies, e.g., objective functions that prioritize specific grants, are an interesting direction for future research. It is noted that this illustrative example does not exploit inter-operator sharing discussed below.

Illustrative Optimization Example With Linear Objective Function and Request-Proportional Constraint Allocations Since the grants $G_{so}$ are non-negative, an elementary objective function can linearly sum the grants $G_{so}$, i.e., as $\sum_{s=1}^{S} \sum_{o=1}^{O} G_{so}$. For the constraint allocation, we consider the aggregate over all Sm-GWs s framework 100 of the aggregated smoothed requests $R_{so}$ for a specific operator o is considered, i.e., the unit norm of the request vector $\|\vec{R}_o\|_1 = \sum_{s=1}^{S} R_{so}$. If $\|\vec{R}_o\|_1$ is less than the operator constraint $K_o$, then the corresponding grants $G_{so}$ are set to the requests, i.e., $G_{so} = R_{so}$. On the other hand, if $\mu\|\vec{R}_o\|_1 > K_o$, then we proportionally assign the operator o backhaul bandwidth $K_o$, i.e., we assign the proportion $R_{so}/\|\vec{R}_o\|_1$ of the constraint $k_o$. Thus, $$G_{SO} = \min\left(R_{SO}, \frac{R_{SO}}{\|\vec{R}_O\|_1} K_O\right). \quad (12)$$

The resulting elementary optimization problem can be summarized as:

$$\text{Maximize} \sum_{s=1}^{S} \sum_{o=1}^{O} G_{SO} \quad (13)$$

Subject to: $\forall s \in \{1, 2, \ldots, S\}$ and $\forall o \in \{1, 2, \ldots, O\}$, $-G_{SO} \leq 0$, $G_{SO} \leq R_{SO}$, $G_{SO} \leq K_O \dfrac{R_{SO}}{\|\vec{R}_O\|_1}.$ Inter-Operator Sharing When the aggregate backhaul bandwidth $\|R_o\|_1$ requested from an operator o exceeds its constraint $K_o$, inter-operator sharing can be employed to route the additional traffic through the network managed by another operator. The Sm-GW multi-operator management provides a distinctive advantage in maintaining active connections with multiple operators to easily route the excess traffic to a sharing operator. It is denoted that o=m for the operator that accepts the sharing traffic from another operator o=e whose traffic constraint has been exceeded. This study focuses on one operator accepting sharing traffic and one operation with excess traffic. The extension to sets of multiple operators accepting sharing traffic and multiple operators with excess traffic is left for future research. An operator in sharing m should have low incoming traffic as compared to the constraint $K_m$ in order to accept the traffic from the operator in excess e. Therefore, for the sharing (o=m) and excess (o=e) operators the requests $R_{so}$ need to satisfy, $$\sum_{s=1}^{S} R_{sm} < K_m, \text{ and } \sum_{s=1}^{S} R_{so} > K_o. \quad (14)$$

The traffic rate from excess operator e that can be carried by sharing operator m depends on the unutilized slack uplink transmission bitrate of operator m:

$$\zeta = K_m - \sum_{s=1}^{S} R_{sm}. \quad (15)$$

If $\zeta > 0$, the last constraint in optimization problem (13) for the excess operator e is replaced by the constraint $$G_{se} \leq (K_e + \zeta)\frac{R_{se}}{\|\vec{R_e}\|_1} \forall s. \qquad (16)$$

Evaluation of Multi-Operator Management

In order to showcase the effectiveness of the SDN based multi-operator management framework, simulations were conducted for the elementary optimization with linear objective function and proportional constraint sharing (see Section V-E). We consider S=2 Sm-GWs frameworks 100 and O=2 operators. As comparison benchmark, we consider a static equal allocation of operator uplink transmission bitrate $K_O$ to the S Sm-GWs frameworks 100, i.e., each Sm-GW framework 100 s, s=1, 2, is allocated $K_o/S$ of the operator o uplink transmission bitrate.

Figure 9:
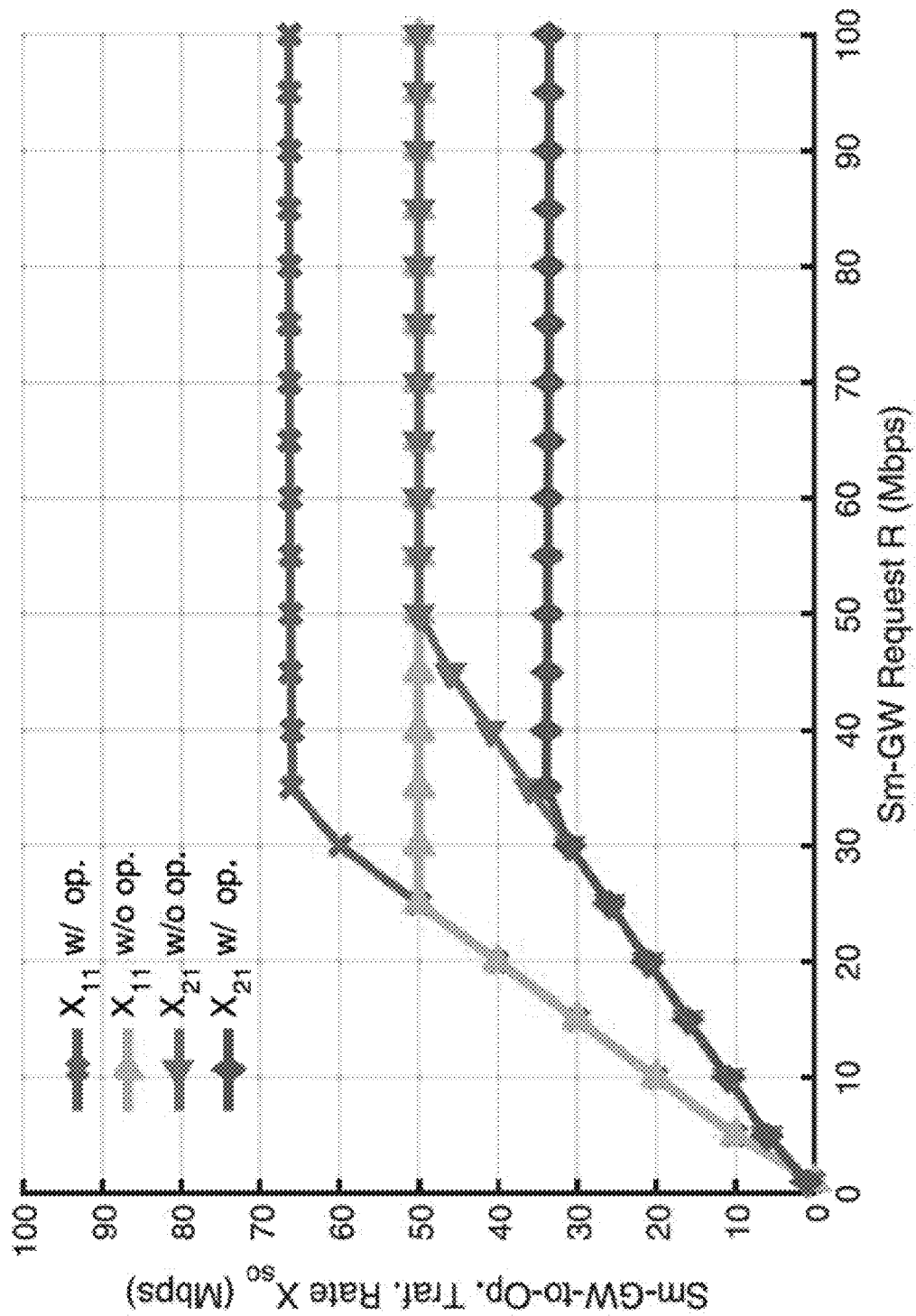
FIG. 9 is a graph illustrating a plot of Sm-GW to operator traffic flow rates resulting from the optimized SDN orchestrator grants $G_{so}$ as a function of uplink transmission bitrate requested by the Sm-GWs, according to one aspect of the present disclosure.

Without Inter-Operator Sharing: In FIG. 9 a graph shows the plot the Sm-GW s framework 100 to operator o traffic flow rates $X_{so}$ resulting from the optimized SDN orchestrator grants $G_{so}$ as a function of the uplink transmission bitrate requested by Sm-GWs framework 100 s=1 and s=2 from operator o=1. Specifically, Sm-GW s=1 requests bitrate $R_{11}$=2R and Sm-GW s=2 requests bitrate $R_{21}$=R from operator o=1. The bitrate requests from operator o=2 are fixed at 50 Mbps. Each operator o, o=1, 2, has uplink transmission bitrate constraint $K_0$=100 Mbps.

FIG. 9 shows that for requests for operator o=1 bitrate up to R=25 Mbps, the traffic rates $X_{11}$ and $X_{21}$ are equal to the requests, irrespective of whether SDN orchestrated optimization is employed or not. In contrast, as the requested bitrate increases above R 25 Mbps, i.e., the bitrate $R_{11}$=2R requested by Sm-GW s=1 from operator o=1 increases above K1/S=50 Mbps, the granted bitrate $G_{11}$ with SDN orchestration and the corresponding traffic flow X11 continue to increase. On the other hand, the granted bitrate $G_{11}$ and traffic flow $X_{11}$ without SDN orchestration stay limited at the static equal share $X_{11}$=$G_{11}$=K1/S=50 Mbps.

As the requested bitrate R increases above 33.3 Mbps, i.e., a total of 3R=100 Mbps requested from operator o=1, from FIG. 9 that without orchestration, the traffic flow $X_{21}$ from Sm-GW s=2 to operator o=1 grows to and then remains at the static equal share $K_1$/S=50 Mbps. That is, the conventional static uplink transmission bitrate allocation results in unfair disproportional backhaul service. In contrast, the dynamic multi-operator management with SDN orchestrated optimization based on proportional sharing adaptively assigns the operator o=1 bitrate to Sm-GWs frameworks 100 s=1 and s=2 proportional to their requests.

Figure 10:
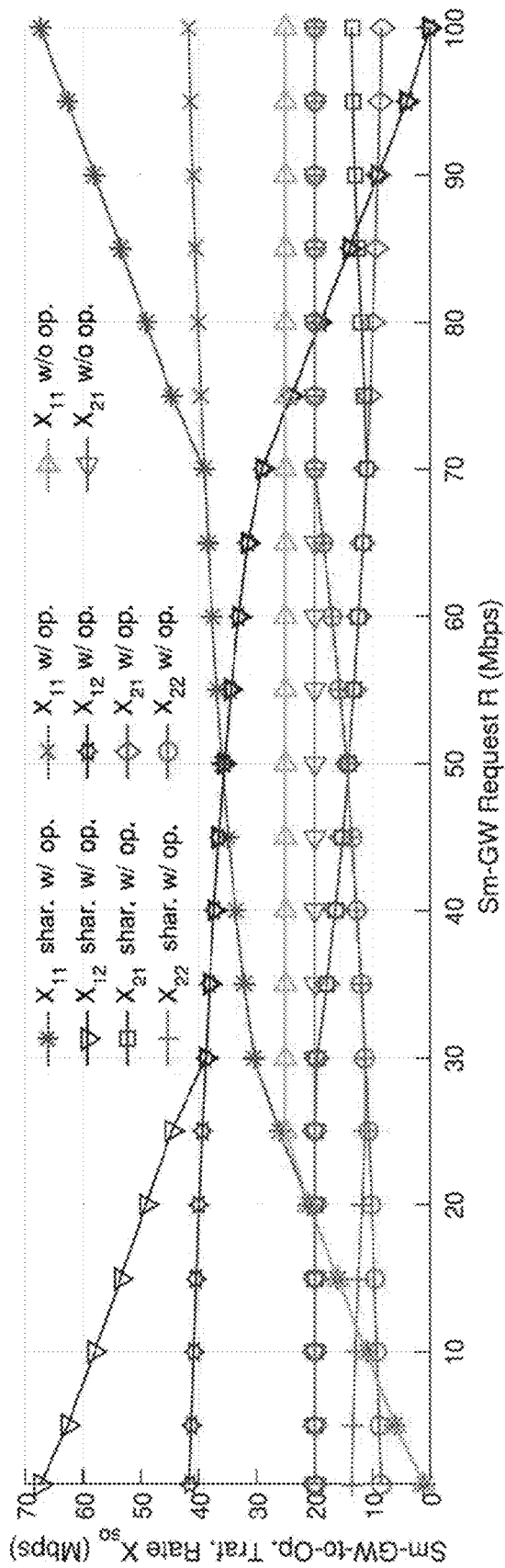
FIG. 10 is a graph illustrating inter-operator sharing evaluation, according to one aspect of the present disclosure.

With Inter-Operator Sharing: In FIG. 10, we plot the Sm-GW s to operator o traffic flow rates $X_{so}$ as a function of the uplink transmission bitrate $R_{11}$=R requested by Sm-GW framework 100 s=1 from operator o=1 when inter-operator sharing is employed. Sm-GW s=1 requests bitrate $R_{12}$=100−R Mbps from operator o=2. Also, Sm-GW framework 100 s=2 requests fixed bitrates $R_{21}$=$R_{22}$=20 Mbps from each operator. Each operator o has a fixed uplink transmission bitrate constraint of $K_o$=50 Mbps. Note that operator o=(m)=1 has slack uplink transmission bitrate when R≤30 Mbps and can thus serve as roaming operator for the excess traffic to operator e=2. As R increases and starts to exceed 70 Mbps, the roles are reversed, so that operator e=1 can send some of its excess traffic to roaming operator m=2.

Focusing initially on the case R=100 Mbps, i.e., the right edge of FIG. 10, we observe that without SDN orchestrated optimization, Sm-GW s=1 can only transmit at its fixed static allocation of $X_{11}$=$K_1$/S=25 Mbps to operator o=1, even though Sm-GW s=1 has a traffic load demanding $R_{11}$=R=100 Mbps. At the same time, Sm-GW s=2 transmits at its requested rate $X_{21}$=R21=20 Mbps<$K_1$/S. Thus, the operator o=1 uplink transmission bitrate $K_1$ is underutilized, even though Sm-GW s=1 has more traffic to send, but cannot due to the inflexible static uplink transmission bitrate allocations.

With SDN orchestrated optimization with proportional sharing (but without inter-operator sharing), the overloaded uplink transmission bitrate $K_1$=50 Mbps of operator o=1 is shared between the two Sm-GWs frameworks 100, allowing Sm-GW framework 100 s=1 to transmit $X_{11}$=$R_{11}$/($R_{11}$+$R_{21}$)=41.7 Mbps, while Sm-GW framework 100 s=2 transmits $X_{21}$=$R_{21}$/($R_{11}$+$R_{21}$)=8.3 Mbps. However, the uplink transmission bitrate $K_2$ of operator o=2 is underutilized with only Sm-GW s=2 transmitting $X_{22}$=20 Mbps.

With inter-operator sharing, the unutilized uplink transmission bitrate $\zeta$=$K_2$−$X_{22}$=30 Mbps of operator o=2, is used to carry excess traffic from operator o=1. In particular, the aggregate of the regular operator o=1 uplink transmission bitrate $K_1$ and the uplink transmission bitrate available to operator o=1 through traffic sharing to operator o=2=($\zeta$30 Mbps), i.e., $K_1$+$\zeta$=80 Mbps is available to operator o=1. With proportional sharing, Sm-GW framework 100 s=1 can transmit $X_{11}$=($K_1$+$\zeta$)$R_{11}$/($R_{11}$+$R_{21}$)=66.7 Mbps, while Sm-GW framework 100 s=2 can correspondingly transmit $X_{21}$=133 Mbps, fully utilizing the backhaul capacities of both operators.

Overall, FIG. 10 shows that across the entire range of traffic loads R from Sm-GW framework 100 s=1 for operator o=1, our SDN based multi-operator orchestration with sharing is able to fully utilize the uplink transmission bitrates of both operators. Note in particular, that depending on the traffic load, the roles of the two operators (excess or sharing) are dynamically adapted.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A method for optimizing resource allocation in a network, the method comprising:
    utilizing software-defined networking to generate a smart gateway framework that virtualizes a plurality of small cell cellular networks and defines a plurality of smart gateways associated with the plurality of small cell cellular networks, the plurality of smart gateways being connected to the servicing gateways and packet gateways associated with a plurality of operators, wherein the smart gateway framework is configured for sharing of backhaul cellular network resources associated with the plurality of small cell cellular networks, by implementing an orchestrator, for:
        forming a plurality of operator-specific virtual small cell networks of enhanced Node Bs from the plurality of small cell cellular networks as virtualized,
        managing the backhaul cellular network resources including dynamically allocating and reconfiguring bandwidth associated with the backhaul cellular network resources to each of the plurality of small cell cellular networks based on operator configurations accessed from the plurality of operators, by:

allocating a smart gateway of the plurality of smart gateways an uplink transmission bitrate toward a cellular operator;

scheduling shares of the uplink transmission bitrate among the plurality of operator-specific virtual small cell networks connected to the smart gateway in an equal share allocation;

collecting one or more uplink requests from the plurality of operator-specific virtual small cell networks; and adaptively allocating one or more grants of the uplink transmission bitrate to each of the plurality of operator-specific virtual small cell networks based on the one or more uplink requests.

2. The method of claim 1, wherein the one or more grants are ad aptively allocated according to a scheduling policy.

3. The method of claim 2, wherein the scheduling policy is an elementary excess share scheduling policy where a lightly loaded enhanced Node B is granted its full request with an unused portion of the equal share allocation for the lightly loaded enhanced Node B accumulated in an excess pool.

4. The method of claim 3, wherein a highly loaded enhanced Node B is allocated an equal share of the excess pool up to its full request.

5. The method of claim 1, wherein collecting the one or more uplink requests includes receiving an uplink request from a first enhanced Node B of the plurality of enhanced Node Bs and denoting an amount of traffic the first enhanced Node B is requesting to transmit to the cellular operator over a cycle of duration.

6. The method of claim 1, further comprising:

sending the one or more grants to the plurality of enhanced Node Bs.

7. The method of claim 6, wherein the one or more grants are sent in parallel.

8. The method of claim 1, wherein the one or more grants are reevaluated upon an identification of a reconfiguration event.

9. The method of claim 1, wherein the orchestrator defines at least one transport controller that configures the smart gateway framework to enable internal LTE X2 tunnel interfaces among all of the connected plurality of operator-specific virtual small cell networks and manages external LTE X2 and S1 interfaces at the smart gateway framework through tunnel establishments to external LTE network core entities.

10. The method of claim 1, wherein the orchestrator configures the plurality of operator-specific virtual small cell networks based on global multi-operator network optimizations.

11. The method of claim 1, wherein the orchestrator coordinates network management across multiple domains associated with the plurality of operator-specific virtual small cell networks, transport networks, and core networks.

12. A system for optimizing resource allocation in a network, the system comprising:

a smart gateway framework, comprising:

a plurality of smart gateways and a plurality of small cell cellular networks associated with the plurality of smart gateways virtualized using software-defined networking, and an orchestrator configured for managing backhaul cellular network resources associated with the plurality of small cell cellular networks based on operator configurations accessed from a plurality of operators;

a plurality of enhanced Node Bs generating one or more uplink requests to transmit to an operator of the plurality of operators over a cycle of duration; and a first smart gateway of the smart gateway framework allocated an uplink transmission bitrate toward the operator, the first smart gateway collecting the one or more uplink requests and adaptively allocating one or more grants of the uplink transmission bitrate to each of the plurality of enhanced Node Bs based on an equal share allocation and the one or more uplink requests, wherein the first smart gateway is associated with a virtualized aggregation of the backhaul network resources, the first smart gateway configured to accommodate flexible communication resource sharing of the backhaul network resources between the plurality of enhanced Node Bs and the operator.

13. The system of claim 12, wherein the one or more grants are adaptively allocated according to an elementary excess share scheduling policy where a lightly loaded enhanced Node B is granted its full request with an unused portion of the equal share allocation for the lightly loaded enhanced Node B accumulated in an excess pool.

14. The system of claim 13, wherein a highly loaded enhanced Node B is allocated an equal share of the excess pool up to its full request.

* * * * *